US012731813B2

(12) United States Patent
Du et al.

(10) Patent No.: US 12,731,813 B2
(45) Date of Patent: Sep. 8, 2026

(54) SOLID-STATE ELECTROLYTE MATERIAL COMPRISING A CHALCOGENIDE-BASED IONIC-CONDUCTIVE STRUCTURE, PARTICULARLY A SULFIDE-BASED IONIC-CONDUCTIVE STRUCTURE

(71) Applicant: Ampcera Inc., Milpitas, CA (US)

(72) Inventors: Hui Du, Tucson, AZ (US); James Emery Brown, Tucson, AZ (US); Sumin Zhu, San Franscisco, CA (US); Chen Chen, Tucson, AZ (US)

(73) Assignee: Ampcera Inc., Tucson, AZ (US)

( * ) Notice: Subject to any disclaimer, the term of this patent is extended or adjusted under 35 U.S.C. 154(b) by 862 days.

(21) Appl. No.: 17/885,514

(22) Filed: Aug. 10, 2022

(65) Prior Publication Data

US 2023/0261254 A1 Aug. 17, 2023

Related U.S. Application Data

(63) Continuation-in-part of application No. PCT/US2022/016064, filed on Feb. 11, 2022.

(51) Int. Cl.
*H01M 10/0562* (2010.01)
*C01B 25/14* (2006.01)

(52) U.S. Cl.
CPC ......... *H01M 10/0562* (2013.01); *C01B 25/14* (2013.01); *C01P 2002/50* (2013.01); *C01P 2002/72* (2013.01); *C01P 2002/74* (2013.01); *C01P 2006/40* (2013.01); *H01M 2300/008* (2013.01)

(58) Field of Classification Search
CPC ..... H01M 10/0562; H01M 2300/0065; H01M 2300/0068; H01M 2300/008
See application file for complete search history.

(56) References Cited

U.S. PATENT DOCUMENTS

| | | | |
|---|---|---|---|
| 6,168,887 | B1 | 1/2001 | Dahn et al. |
| 9,899,701 | B2 | 2/2018 | Miyashita et al. |
| 2013/0337293 | A1 | 12/2013 | Eisele et al. |

(Continued)

FOREIGN PATENT DOCUMENTS

| | | | |
|---|---|---|---|
| CN | 103943880 A | * | 7/2014 |
| JP | 2018045997 A | | 3/2018 |

(Continued)

OTHER PUBLICATIONS

Zhang, Z. et al. All-in-one improvement toward Li6PS5Br-Based solid electrolytes triggered by compositional tune. Journal of Power Sources. 410-411, 162-170 (Year: 2019).*

(Continued)

*Primary Examiner* — Marla D McConnell
*Assistant Examiner* — Julia S Caserto
(74) *Attorney, Agent, or Firm* — Walters & Wasylyna LLC

(57) ABSTRACT

A solid-state electrolyte material, comprising: a chalcogenide-based ionic-conductive structure comprising: one or more of lithium, sodium, aluminum, magnesium, iron, and potassium; one or more of sulfur, oxygen, selenium, and tellurium; one or more of boron, gallium, antimony, silicon, germanium, tin, phosphorus, and arsenic; and at least one of excess chalcogen and excess chalcogenide incorporated into the chalcogenide-based ionic-conductive structure.

16 Claims, 7 Drawing Sheets

(56) References Cited

U.S. PATENT DOCUMENTS

| | | | | |
|---|---|---|---|---|
| 2016/0293946 | A1 | 10/2016 | Ritter et al. | |
| 2017/0040637 | A1 * | 2/2017 | Ceder | H01M 10/0525 |
| 2017/0170515 | A1 * | 6/2017 | Yushin | H01M 4/582 |
| 2018/0351148 | A1 | 12/2018 | Schneider et al. | |
| 2020/0266484 | A1 | 8/2020 | Du et al. | |
| 2021/0020984 | A1 * | 1/2021 | Ito | H01M 10/0562 |
| 2021/0119247 | A1 | 4/2021 | Hyoungchul et al. | |
| 2022/0045358 | A1 * | 2/2022 | Liang | H01M 10/052 |

FOREIGN PATENT DOCUMENTS

| | | |
|---|---|---|
| KR | 10-2014-0116158 | 10/2014 |
| KR | 10-2020-0093682 | 8/2020 |
| WO | WO 2022/174011 | 8/2022 |

OTHER PUBLICATIONS

Wang, S. et al. High-Conductivity Argyrodite Li6PS5Cl Solid Electrolytes Prepared via Optimized Sintering Processes for All-Solid-State Lithium-Sulfur Batteries. ACS Applied Materials & Interfaces. 10, 42279-42285 (Year: 2018).*

Lau, J. et al. Sulfide Solid Electrolytes for Lithium Battery Applications. Advanced Energy Materials. 8, 1800933 (Year: 2018).*

European Patent Office, "Communication pursuant to Rules 70(2) and 70a(2) EPC," App. No. 22753391.6 (Dec. 17, 2024).

European Patent Office, "Communication pursuant to Article 94(3) EPC," App. No. 23190912.8 (Oct. 31, 2024).

European Patent Office, Extended European Search Report, App. No. 23190912.8 (Jan. 29, 2024).

Japan Patent Office, Office Action, App. No. 2023-548811 (Apr. 14, 2026).

Official Action, Korean Intellectual Property Office, App. No. 10-2023-7027301 (May 27, 2026).

* cited by examiner

A: P-S Plane
B: Li-S Plane
C: P-S-Li-Cl Plane
B*: Li-S Stacking Fault Layer
B**: Li-S Superlattice-Like Stacking Fault

2
A
B
C
A
B
C

18
A
B
V*
C
A
B
C

20
A
B
V**
V**
C
A
B
C

A: P-S Plane
B: Li-S Plane
C: P-S-Li-Cl Plane
V*: $V_{Li}$-S Stacking Fault Layer
V**: $V_{Li}$-S Superlattice-Like Stacking Fault A: P-S Plane
B: Li-S Plane
C: P-S-Li-Cl Plane
V*: $V_{Li}$-S Stacking Fault Layer
V**: $V_{Li}$-S Superlattice-Like Stacking Fault A: P-S Plane
B: Li-S Plane
C: P-S-Li-Cl Plane
V*: $V_{Li}$-S Stacking Fault Layer
V**: $V_{Li}$-S Superlattice-Like Stacking Fault

SOLID-STATE ELECTROLYTE MATERIAL COMPRISING A CHALCOGENIDE-BASED IONIC-CONDUCTIVE STRUCTURE, PARTICULARLY A SULFIDE-BASED IONIC-CONDUCTIVE STRUCTURE

PRIORITY

The present application is a continuation-in-part of International Patent Application No. PCT/US22/16064, filed Feb. 11, 2022, and claims the priority of U.S. Provisional Patent Application No. 63/148,155, filed Feb. 11, 2021, both of which are incorporated herein by reference in their entireties.

FIELD

The present application relates to the field of solid-state electrolyte materials.

BACKGROUND

Sulfide-based ionic-conductive argyrodite structures are potential candidates for a solid-state electrolyte material for secondary batteries, particularly solid-state batteries. However, challenges remain for sulfide-based ionic-conductive argyrodite structures. For example, metal dendrite growth can penetrate through the sulfide-based ionic-conductive argyrodite structures leading to battery shorting.

Accordingly, those skilled in the art continue with research and development in the field of solid-state electrolyte materials.

SUMMARY

In one embodiment, a solid-state electrolyte material, comprises: a chalcogenide-based ionic-conductive structure comprising: one or more of lithium, sodium, aluminum, magnesium, iron, and potassium; one or more of sulfur, oxygen, selenium, and tellurium; one or more of boron, gallium, antimony, silicon, germanium, tin, phosphorus, and arsenic; and at least one of excess chalcogen and excess chalcogenide incorporated into the chalcogenide-based ionic-conductive structure.

In another embodiment, a solid-state electrolyte material, comprises: a sulfide-based ionic-conductive structure comprising: lithium; sulfur and optionally in combination with oxygen, selenium, tellurium, or a combination thereof; one or more of boron, gallium, antimony, silicon, germanium, tin, phosphorus, and arsenic; and at least one of excess sulfur and excess lithium sulfide incorporated into the sulfide-based ionic-conductive structure.

In yet another embodiment, a solid-state electrolyte material, comprises: a sulfide-based ionic-conductive argyrodite structure comprising: lithium; sulfur and optionally in combination with oxygen, selenium, tellurium, or a combination thereof; one or more of boron, gallium, antimony, silicon, germanium, tin, phosphorus, and arsenic; one or more halogens; and excess sulfur incorporated into the sulfide-based ionic-conductive argyrodite structure.

In yet another embodiment, a solid-state electrolyte material, comprises: a sulfide-based ionic-conductive argyrodite structure comprising: lithium; sulfur and optionally in combination with oxygen, selenium, tellurium, or a combination thereof; one or more of boron, gallium, antimony, silicon, germanium, tin, phosphorus, and arsenic; one or more halogens; and excess lithium sulfide incorporated into the sulfide-based ionic-conductive argyrodite structure.

Other embodiments of the disclosed solid-state electrolyte material will become apparent from the following detailed description, the accompanying drawings and the appended claims.

BRIEF DESCRIPTION OF THE DRAWINGS

FIG. 4: A schematic representation of standard unit cell and unit cell with stacking fault layers.

FIG. 5: A schematic representation of two standard neighboring unit cells and two standard neighboring unit cells with stacking faults.

DETAILED DESCRIPTION

Figure 1A:
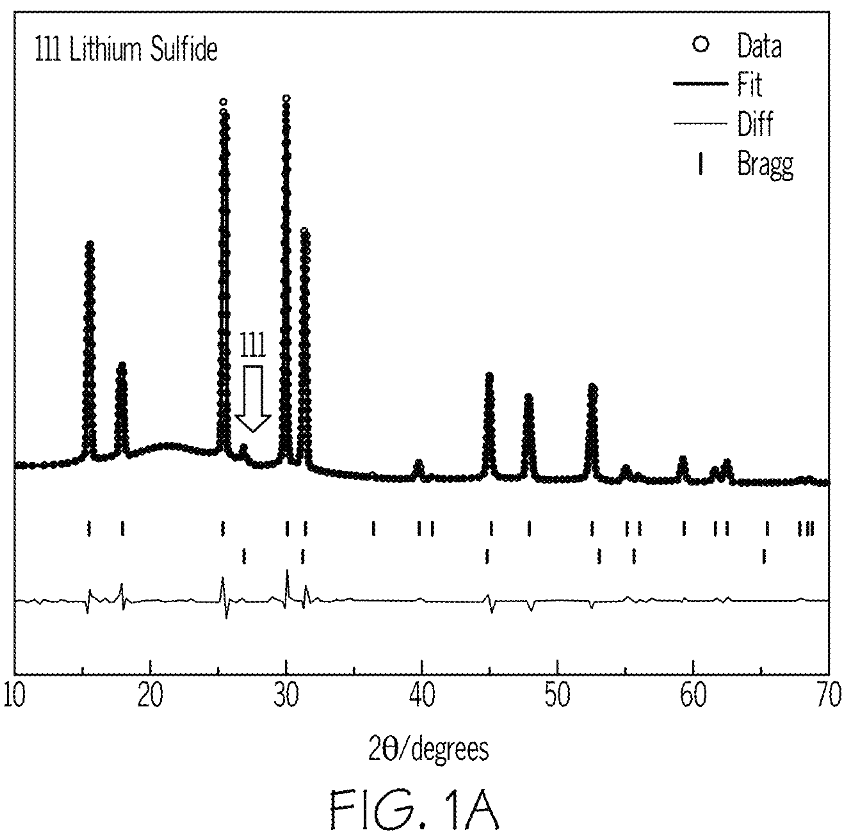
FIG. 1A is an X-ray diffraction pattern for a stuffed sulfide-based ionic-conductive argyrodite structure of the present description.

Sulfide-based ionic-conductive argyrodite structures are potential candidates for a solid-state electrolyte material for secondary batteries, particularly solid-state batteries. However, challenges remain for sulfide-based ionic-conductive argyrodite structures. For example, sulfur vacancies can increase the electronic conductivity of argyrodite structures, resulting in metal dendrite growth that can penetrate therethrough leading to battery shorting. The sulfur vacancies can also restrict the electrochemical window of a battery that uses argyrodite as an electrolyte, limiting energy density. Battery performance may be enhanced by filling the sulfur vacancies in the argyrodite with excess sulfur. The present description relates to addressing these and other challenges to provide chalcogenide-based and sulfide-based ionic-conductive structures to provide for an improved solid-state electrolyte material.

The present description relates to a solid-state electrolyte material comprising: a chalcogenide-based ionic-conductive structure comprising: one or more of lithium, sodium, aluminum, magnesium, iron, and potassium; one or more of sulfur, oxygen, selenium, and tellurium; one or more of boron, gallium, antimony, silicon, germanium, tin, phosphorus, and arsenic; and at least one of excess chalcogen and excess chalcogenide incorporated into the chalcogenide-based ionic-conductive structure, forming what is termed as a stuffed structure.

Typically, the chalcogenide-based ionic-conductive structure has one of lithium, sodium, aluminum, magnesium, iron, and potassium for the reactive metal ion. In a preferred example, the chalcogenide-based ionic-conductive structure has lithium for the reactive metal ion. In a preferred example, the chalcogenide-based ionic-conductive structure may be sulfide-based having only sulfur or having sulfur in combination with oxygen, selenium, and tellurium.

The present description also relates to a solid-state electrolyte material comprising: a sulfide-based ionic-conductive structure comprising: lithium; sulfur and optionally in combination with oxygen, selenium, tellurium, or a combination thereof; one or more of boron, gallium, antimony, silicon, germanium, tin, phosphorus, and arsenic; and at least one of excess sulfur and excess lithium sulfide incorporated into the sulfide-based ionic-conductive structure, forming what is termed as a sulfur-stuffed structure. The sulfide-based ionic-conductive structure may have only sulfur or may have sulfur in combination with oxygen, selenium, and tellurium.

In an aspect, the chalcogenide-based or sulfide-based ionic-conductive structure may have one of boron, gallium, antimony, silicon, germanium, tin, phosphorus, and arsenic. In another aspect, the chalcogenide-based or sulfide-based ionic-conductive structure may have two of boron, gallium, antimony, silicon, germanium, tin, phosphorus, and arsenic. In another aspect, the chalcogenide-based or sulfide-based ionic-conductive structure may have more than two of boron, gallium, antimony, silicon, germanium, tin, phosphorus, and arsenic.

In the chalcogenide-based ionic-conductive structure, the excess chalcogen may be sulfur, oxygen, selenium, tellurium, or a combination thereof. In a preferred example, the excess chalcogen is excess sulfur. The excess chalcogen or excess sulfur of the present description is incorporated into the chalcogenide-based or sulfide-based ionic-conductive structure as opposed to being in a mixture with the chalcogenide-based or sulfide-based ionic-conductive structure. In an aspect, the excess chalcogen or excess sulfur may be incorporated into the structure in the form of being disposed within vacancies of the structure. Additionally, or alternatively, the excess chalcogen or excess sulfur may be incorporated into the structure in the form being disposed within interstitials of the structure. Additionally, or alternatively, the excess chalcogen or excess sulfur may be incorporated into the structure in the form of superlattice stacking faults within structure.

In the chalcogenide-based ionic-conductive structure, the excess chalcogenide may be a chalcogenide of one or more of lithium, sodium, aluminum, magnesium, iron, and potassium with one or more of sulfur, oxygen, selenium, and tellurium. In an example, the chalcogenide is lithium with one or more of sulfur, oxygen, selenium, and tellurium. In another example, the chalcogenide is one or more of lithium, sodium, aluminum, magnesium, iron, and potassium with sulfur. In a preferred example, the chalcogenide is lithium sulfide.

The excess chalcogenide or excess lithium sulfide of the present description is incorporated into the chalcogenide-based or sulfide-based ionic-conductive structure as opposed to being in a mixture with the chalcogenide-based or sulfide-based ionic-conductive structure. In an aspect, the excess chalcogenide or excess lithium sulfide may be incorporated into the structure in the form of a chalcogenide or lithium sulfide layer within the structure. In another aspect, the excess chalcogenide or excess lithium sulfide may be present in form of superlattice stacking faults of multiple chalcogenide or lithium sulfide layers within the structure. The chalcogenide-based or sulfide-based ionic-conductive structure may be characterized by having a visible (111) peak corresponding to the excess chalcogenide or excess lithium sulfide in an X-ray diffraction pattern. The excess chalcogenide peak intensity may preferably be greater than 3% of the peak intensities for the sulfide-based ionic-conductive argyrodite structure, more preferably greater than 4%, more preferably greater than 5%, more preferably greater than 10%, more preferably greater than 15%, etc. Alternatively, such structures can be observed using transmission electron microscopy (TEM) or high resolution transmission electron microscopy (HRTEM).

Figure 2:
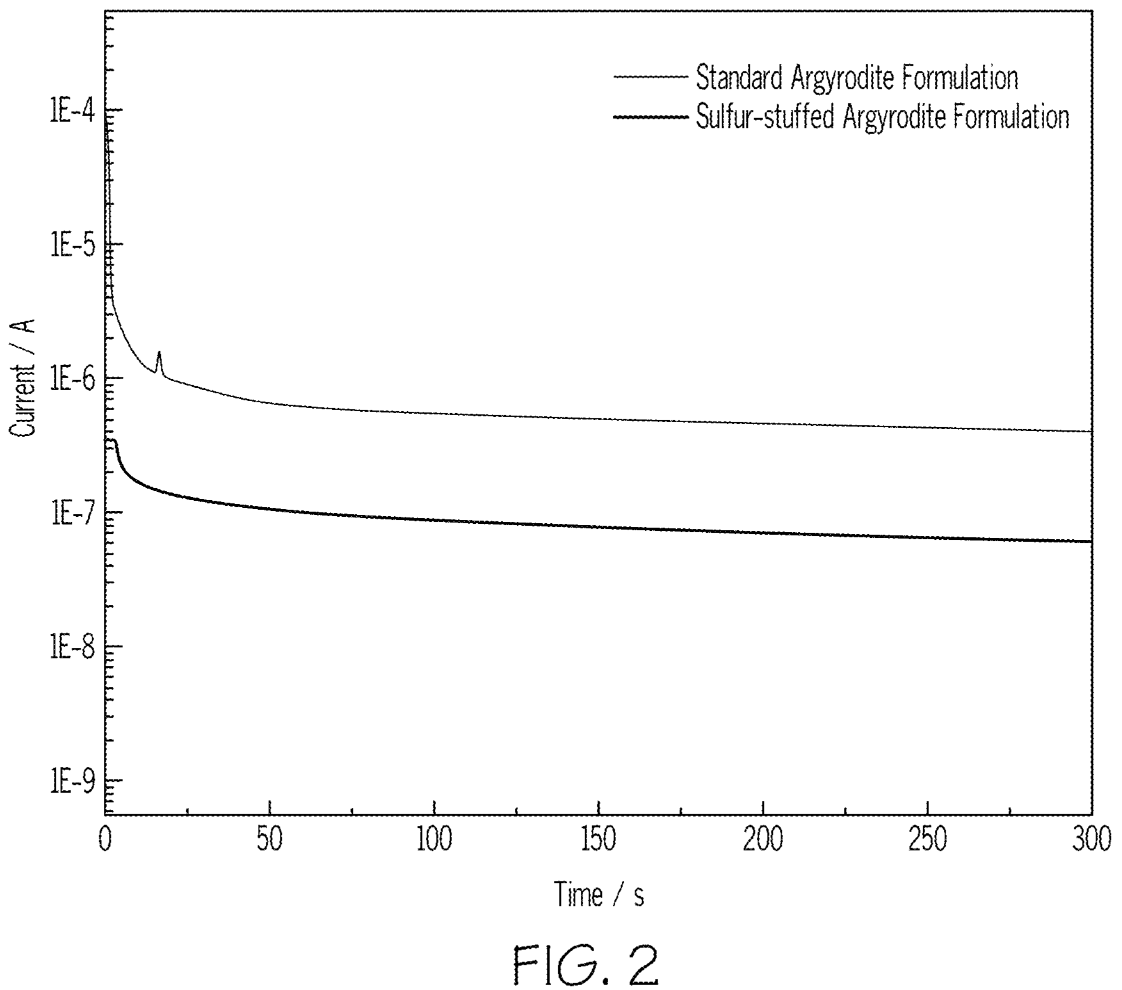
FIG. 2: A Hebb-Wagner polarization curve for a stuffed argyrodite and a nominal stoichiometric argyrodite.

In an aspect, the at least one of excess chalcogen (e.g., sulfur) and excess chalcogenide (e.g., lithium sulfide) incorporated into the chalcogenide-based (e.g., sulfide-based) ionic-conductive structure may lower an electronic conductivity of the chalcogenide-based ionic-conductive structure, as demonstrated in FIG. 2. In an aspect, the at least one of excess chalcogen (e.g., sulfur) and excess chalcogenide (e.g., lithium sulfide) incorporated into the chalcogenide-based ionic-conductive structure may increase a critical current density of the chalcogenide-based ionic-conductive structure, as demonstrated in FIG. 3. Although the present description is not limited by theory, it is believed that the reduction in electronic conductivity and/or increase in critical current density may be due to the excess chalcogenide (e.g., lithium sulfide) or excess chalcogen (e.g., sulfur) stacking faults in the chalcogenide-based (e.g., sulfide-based) ionic-conductive structure. In the case of excess chalcogenide (e.g., lithium sulfide), the one or more chalcogenide (e.g., lithium sulfide) stacking faults may serve as a barrier layer preventing electron migration through the bulk material. In the case of excess chalcogen (e.g., sulfur), the one or more vacant chalcogenide (e.g., lithium sulfide) stacking faults combined with the low electronic conductivity of chalcogen (e.g., sulfur) may restrict electron migration through the bulk material. However, other mechanisms for the reduction in electronic conductivity and/or increase in critical current density may be additionally or alternatively be present. In another aspect, the at least one of excess chalcogen (e.g., sulfur) and excess chalcogenide (e.g., lithium sulfide) incorporated into the chalcogenide-based ionic-conductive structure may increase chemically stability with lithium metal (or sodium metal, aluminum metal, magnesium metal, iron metal, or potassium metal), which may be a contributing factor for the enhanced critical current density. In the case of both excess chalcogenide (e.g., lithium sulfide) and chalcogen (e.g., sulfur), excess materials may form a passivation layer on the lithium metal surface, forming a more stable solid electrolyte interface layer. In yet another aspect, the combination of lower electronic conductivity and higher critical current density may enhance the lithium (or sodium, aluminum, magnesium, iron, or potassium) dendrite suppression capability of the chalcogenide-based ionic-conductive structure, enabling a longer cycle life in solid-state metal batteries.

In some aspects, the chalcogenide-based (e.g., sulfide-based) ionic-conductive structure having the at least one of excess chalcogen (e.g., sulfur) and excess chalcogenide (e.g., lithium sulfide) can be compared to a nominal stoichiometric chalcogenide-based (e.g., sulfide-based) ionic-conductive structure not having the at least one of excess chalcogen (e.g., sulfur) and excess chalcogenide (e.g., lithium sulfide). In an aspect, the electronic conductivity of the chalcogenide-based (e.g., sulfide-based) ionic-conductive structure of the present description is less than an electronic conductivity of the nominal stoichiometric chalcogenide-based ionic-conductive structure not having the at least one of excess chalcogen and excess chalcogenide, preferably less than half, more preferably less than a quarter of the electronic conductivity of the nominal stoichiometric chalcogenide-based ionic-conductive structure. For example, the inventors of the present description have achieved a chalcogenide-based ionic-conductive structure of the present description in which the electronic conductivity is approximately a tenth of an electronic conductivity of a nominal stoichiometric chalcogenide-based ionic-conductive structure, as demonstrated in FIG. 2. In another aspect, the critical current density of the chalcogenide-based (e.g., sulfide-based) ionic-conductive structure of the present description is greater than a critical current density of the nominal stoichiometric chalcogenide-based ionic-conductive structure not having the at least one of excess chalcogen and excess chalcogenide, preferably at least 10% greater, more preferably at least 20% greater, more preferably at least 30% greater, and more preferably at least 40% greater. For example, the inventors of the present description have achieved a chalcogenide-based ionic-conductive structure of the present description in which the critical current density is at last 40% greater than the critical current density of a nominal stoichiometric chalcogenide-based ionic-conductive structure, as demonstrated in FIG. 3.

In an aspect, chalcogenide-based or sulfide-based ionic-conductive structure may have an argyrodite structure or non-argyrodite structure. The chalcogenide-based or sulfide-based ionic-conductive non-argyrodite structures should have a relatively high room temperature ionic conductivity (e.g., $\geq 10^{-5}$ S $cm^{-1}$) and preferably contain the elements lithium, sulfur, and phosphorous (or a mixture of phosphorous with a non-phosphorus element). An example includes Thio-LISCON $Li_{10}GeP_2S_{12+n}$, where n corresponds to excess sulfur, where n>0, preferably where n>0.01, more preferably in the range of 0.01<n<1. Another example includes Thio-LISCON $Li_{10+2n}GeP_2S_{12+n}$, where n corresponds to excess lithium sulfide, where n>0, preferably where n>0.01, more preferably in the range of 0.3<n<20. Additionally, or alternatively, the chalcogenide-based or sulfide-based ionic-conductivity non-argyrodite contain the elements lithium, sulfur, phosphorous (or a mixture of phosphorous with a non-phosphorus element), and one or more halogens. An example includes $Li_{9.54}Si_{1.74}P_{1.44}S_{11.7+n}Cl_{0.3}$, where n corresponds to excess sulfur, where n>0, preferably where n>0.01, more preferably in the range of 0.01<n<1. Another example includes $Li_{9.54+2n}Si_{1.74}P_{1.44}S_{11.7+n}Cl_{0.3}$, where n correspond corresponds to excess lithium sulfide, where n>0, preferably where n>0.01, more preferably in the range of 0.3<n<20. Other formulas for non-argyrodite structures having excess chalcogen or excess chalcogenide incorporated into the structure will become apparent to those skilled in the art.

The present description also relates to a solid-state electrolyte material comprising: a sulfide-based ionic-conductive argyrodite structure comprising: lithium; sulfur and optionally in combination with oxygen, selenium, tellurium, or a combination thereof; one or more of boron, gallium, antimony, silicon, germanium, tin, phosphorus, and arsenic; one or more halogens; and excess sulfur incorporated into the sulfide-based ionic-conductive argyrodite structure.

In one example, the sulfide-based ionic-conductive argyrodite structure may have the general formula: $Li_{12-m-x}M^{m+Y}{}_{(6-x)+n}X_x$, where $M^{m+}=B^{3+}$, $Ga^{3+}$, $Sb^{3+}$, $Si^{4+}$, $Ge^{4+}$, $Sn^{4+}$, $P^{5+}$, $As^{5+}$, or a combination thereof; where $Y=S^{2-}$, and optionally in combination with $O^{2-}$, $Se^{2-}$, $Te^{2-}$, or a combination thereof; where $X^-=F^-$, $Cl^-$, $Br^-$, $I^-$, or a combination thereof; where x is in the range of $0\leq x\leq 2$; and where n is >0, preferably where n is >0.01, more preferably in the range of $0.01<n\leq 1$.

In another example, the sulfide-based ionic-conductive argyrodite structure may have the general formula: $Li_{18-2m-x}M_2{}^{m+}Y_{(9-x)+n}X_x$, where $M^{m+}=B^{3+}$, $Ga^{3+}$, $Sb^{3+}$, $Si^{4+}$, $Ge^{4+}$, $Sn^{4+}$, $P^{5+}$, $As^{5+}$, or a combination thereof; where $Y=S^{2-}$, and optionally in combination with $O^{2-}$, $Se^{2-}$, $Te^{2-}$, or a combination thereof; where $X^-=F^-$, $Cl^-$, $Br^-$, $I^-$, or a combination thereof; where x is in the range of $0\leq x\leq 2$; and where n is >0, preferably where n is >0.01, more preferably in the range of $0.01<n\leq 1$.

In another example, the sulfide-based ionic-conductive argyrodite structure may have the general formula: $Li_{24-3m-x}M_3{}^{m+Y}{}_{(12-x)+n}X$, where $M^{m+}=B^{3+}$, $Ga^{3+}$, $Sb^{3+}$, $Si^{4+}$, $Ge^{4+}$, $Sn^{4+}$, $P^{5+}$, $As^{5+}$, or a combination thereof; where $Y=S^{2-}$, and optionally in combination with $O^{2-}$, See-, Te2-, or a combination thereof; where $X^-=F^-$, $Cl^-$, $Br^-$, $I^-$, or a combination thereof; where x is in the range of $0\leq x\leq 2$; and where n is >0, preferably where n is >0.01, more preferably in the range of $0.01<n\leq 1$.

A sulfide-based ionic-conductive argyrodite structure may have an excess sulfur n value in the preferred range of 0.01<n<1, more preferably in the range of 0.05<n<1, more preferably in the range of 0.1<n<1, more preferably in the range of 0.2<n<1, more preferably in the range of 0.3<n<1, more preferably in the range of 0.4<n<1, more preferably in the range of 0.5<n<1, etc.

Other formulas for chalcogenide-based or sulfide-based ionic-conductive argyrodite structures having excess chalcogen or excess sulfur incorporated into the structure will become apparent to those skilled in the art.

The present description also relates to a solid-state electrolyte material comprising: a sulfide-based ionic-conductive argyrodite structure comprising: lithium; sulfur and optionally in combination with oxygen, selenium, tellurium, or a combination thereof; one or more of boron, gallium, antimony, silicon, germanium, tin, phosphorus, and arsenic; one or more halogens; and excess lithium sulfide incorporated into the sulfide-based ionic-conductive argyrodite structure.

In one example, the sulfide-based ionic-conductive argyrodite structure may have the general formula: $Li_{12-m-x+2n}M^{m+}Y_{(6-x)+n}X_x$, where $M^{m+}=B^{3+}$, $Ga^{3+}$, $Sb^{3+}$, $Si^{4+}$, $Ge^{4+}$, $Sn^{4+}$, $P^{5+}$, $As^{5+}$, or a combination thereof; where $Y=S^{2-}$, and optionally in combination with $O^{2-}$, $S^{2-}$, $Te^{2-}$, or a combination thereof; where $X^-=F^-$, $Cl^-$, $Br^-$, $I^-$, or a combination thereof; where x is in the range of $0\leq x\leq 2$; and where n is >0, preferably where n is >0.01, more preferably in the range of $0.3<n\leq 20$.

In another example, the sulfide-based ionic-conductive argyrodite structure may have the general formula: $Li_{18-2m-x+2n}M_2{}^{m+}Y_{(9-x)+n}X_x$ where $M^{m+}=B^{3+}$, $Ga^{3+}$, $Sb^{3+}$, $Si^{4+}$, $Ge^{4+}$, $Sn^{4+}$, $P^{5+}$, $As^{5+}$, or a combination thereof; where $Y=S^{2-}$, and optionally in combination with $O^{2-}$, $S^{2-}$, $Te^{2-}$, or a combination thereof; where $X^-=F^-$, $Cl^-$, $Br^-$, $I^-$, or a combination thereof; where x is in the range of $0\leq x\leq 2$; and where n is >0, preferably where n is >0.01, more preferably in the range of $0.3<n\leq 20$.

In another example, the sulfide-based ionic-conductive argyrodite structure may have the general formula: $Li_{24-3m-x+2n}M_3^{m+}Y_{(12-x)+n}X_x$, where Mm+=$B^{3+}$, $Ga^{3+}$, $Sb^{3+}$, $Si^{4+}$, $Ge^{4+}$, $Sn^{4+}$, $P^{5+}$, $As^{5+}$, or a combination thereof; where Y=$S^{2-}$, and optionally in combination with $O^{2-}$, $S^{2-}$, $Te^{2-}$, or a combination thereof; where $X^-$=$F^-$, $Cl^-$, $Br^-$, $I^-$, or a combination thereof; where x is in the range of $0 \leq x \leq 2$; and where n is >0, preferably where n is >0.01, more preferably in the range of $0.3<n \leq 20$.

A sulfide-based ionic-conductive argyrodite structure may have an excess lithium sulfide n value in the preferred range of 0.3<n<20, more preferably in the range of 0.5<n<20, more preferably in the range of 1<n<20, more preferably in the range of 1.5<n<20, more preferably in the range of 2<n<20, etc.

Other formulas for chalcogenide-based or sulfide-based ionic-conductive argyrodite structures having excess chalcogenide or excess lithium sulfide incorporated into the structure will become apparent to those skilled in the art.

Throughout the present description, references will made to the sulfide-based ionic-conductive argyrodite structures, but the principles herein apply to chalcogenide-based structures and to non-argyrodite structures.

The argyrodite formulations of the present description may have a lower electronic conductivity than an argyrodite formulation having the nominal stoichiometric structure. Such a reduction in the electronic conductivity of argyrodite is demonstrated in the Hebb-Wagner polarization curve in FIG. 2.

The argyrodite formulations of the present description may have a higher critical current density than an argyrodite formulation having the nominal stoichiometric structure. Such an enhanced critical current density of argyrodite of the present description is demonstrated in the symmetric lithium-lithium cycling cures in FIG. 3.

The reduction in electronic conductivity and increase in critical current density may be due to the excess $Li_2S$ or excess sulfide stacking faults in the argyrodite crystal structure. In the case of excess $Li_2S$, the one or more $Li_2S$ stacking faults may serve as a barrier layer preventing electron migration through the bulk material. In the case of excess sulfide, the one or more vacant lithium-sulfide stacking faults combined with the low electronic conductivity of sulfur may restrict electron migration through the bulk material.

The argyrodite formulations of the present description may be more chemically stability with lithium metal than an argyrodite formulation having the nominal stoichiometric structure, which may be a contributing factor for the enhanced critical current density in FIG. 3. In the case of both excess $Li_2S$ and sulfide, excess materials may form a passivation layer on the lithium metal surface, forming a more stable solid electrolyte interface layer.

The combination of lower electronic conductivity and higher critical current density may enhance the lithium dendrite suppression capability of an argyrodite formulation of the present description over that of an argyrodite formulation having the nominal stoichiometric structure, enabling a longer cycle life in solid-state lithium metal batteries.

In an aspect, the electronic conductivity of the chalcogenide-based (e.g., sulfide-based) ionic-conductive structure (argyrodite structure) of the present description is $<10^{-7}$ S/cm, preferably $<10^{-8}$ S/cm, more preferably $<10^{-9}$ S/cm, more preferably $<10^{-10}$ S/cm. In another aspect, the critical current density of the chalcogenide-based (e.g., sulfide-based) ionic-conductive structure is greater than 0.2 $mA/cm^2$, preferably greater than 0.4 $mA/cm^2$, more preferably greater than 0.6 $mA/cm^2$, more preferably greater than 0.8 $mA/cm^2$, more preferably greater than 1.0 $mA/cm^2$, more preferably greater than 2.0 $mA/cm^2$, more preferably greater than 3.0 $mA/cm^2$, more preferably greater than 4.0 $mA/cm^2$, more prferably greater than 5.0 $mA/cm^2$.

Figure 1B:
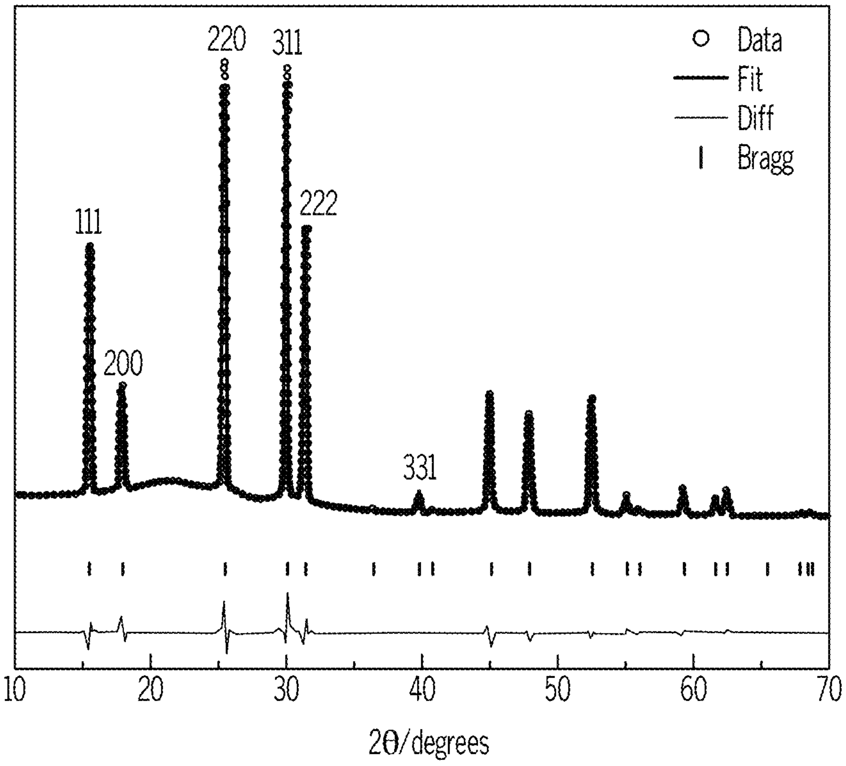
FIG. 1B is an X-ray diffraction pattern for a nominal stoichiometric sulfide-based ionic-conductive argyrodite.

FIG. 1A is X-ray diffraction patterns for a stuffed sulfide-based ionic-conductive argyrodite structure of the present description. FIG. 1B is X-ray diffraction patterns for a nominal stoichiometric sulfide-based ionic-conductive argyrodite. FIG. 1A shows a single lithium sulfide peak at 27° corresponding to the (111)-lithium sulfide peak. The single lithium sulfide peak further indicates the integration of lithium sulfide in the form of superlattice stacking faults as opposed to excess precursor wherein one you would expect multiple lithium sulfide peaks to be present. The lithium sulfide peak intensity may be greater than 3% of the peak intensities for the sulfide-based ionic-conductive argyrodite structure. Alternatively, such structures can be observed using transmission electron microscopy (TEM) or high resolution transmission electron microscopy (HRTEM).

FIG. 2: A Hebb-Wagner polarization curve at a constant voltage of 0.3V demonstrating a one order of magnitude reduction in electronic conductivity for a stuffed argyrodite (bottom of FIG. 2) formulation of the present description over that of a nominal stoichiometric sulfide-based ionic-conductive argyrodite (i.e., standard argyrodite formulation) (top of FIG. 2). Evaluation was done at room temperature under 330 MPa of pressure in a PEEK-type split-cell (1.13 $cm^2$) using 250 mg of solid-state electrolyte material (0.1 mm in thickness). Electronic conductivity values of $3.8\times10^{-8}$ and $4.4\times10^{-7}$ S/cm were recorded for the stuffed argyrodite and standard or nominal stoichiometric argyrodite formulations, respectively.

Figures 3A, 3B:
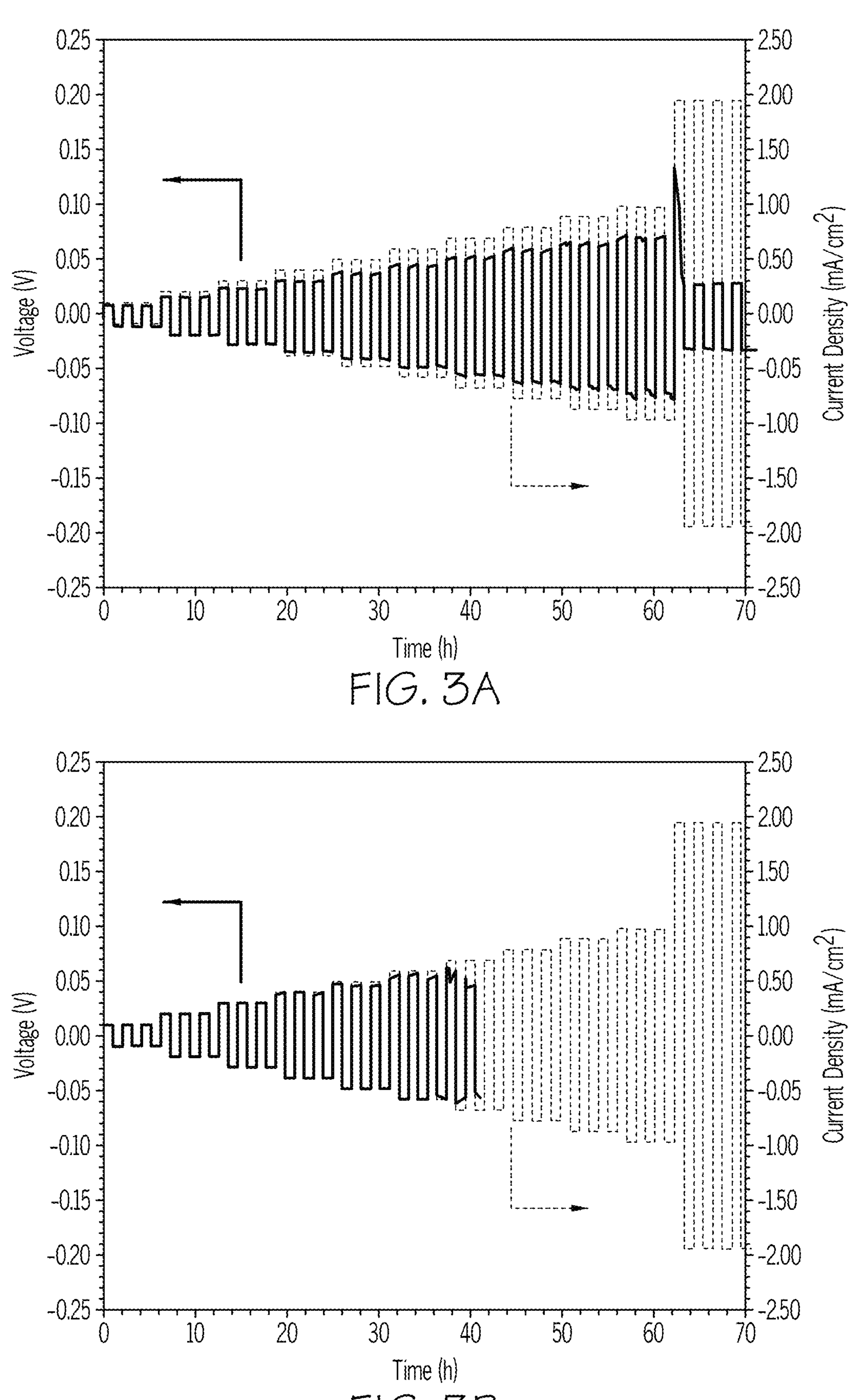
FIG. 3A: Symmetric lithium-lithium cycling curves for a stuffed argyrodite formulation.
FIG. 3B: Symmetric lithium-lithium cycling curves for a nominal stoichiometric argyrodite formation.

FIGS. 3A and 3B: Symmetric lithium-lithium cycling curves for (FIG. 3A) a stuffed argyrodite formulation and (FIG. 3B) its nominal stoichiometric argyrodite formation. Evaluation was done at room temperature under 201 MPa of pressure using lithium/magnesium alloy electrodes. The stuffed argyrodite formulation exhibited an enhanced critical current density (1 $mA/cm^2$) over that of its nominal stoichiometric argyrodite formulation (0.7 $mA/cm^2$).

Figures 4, 5:
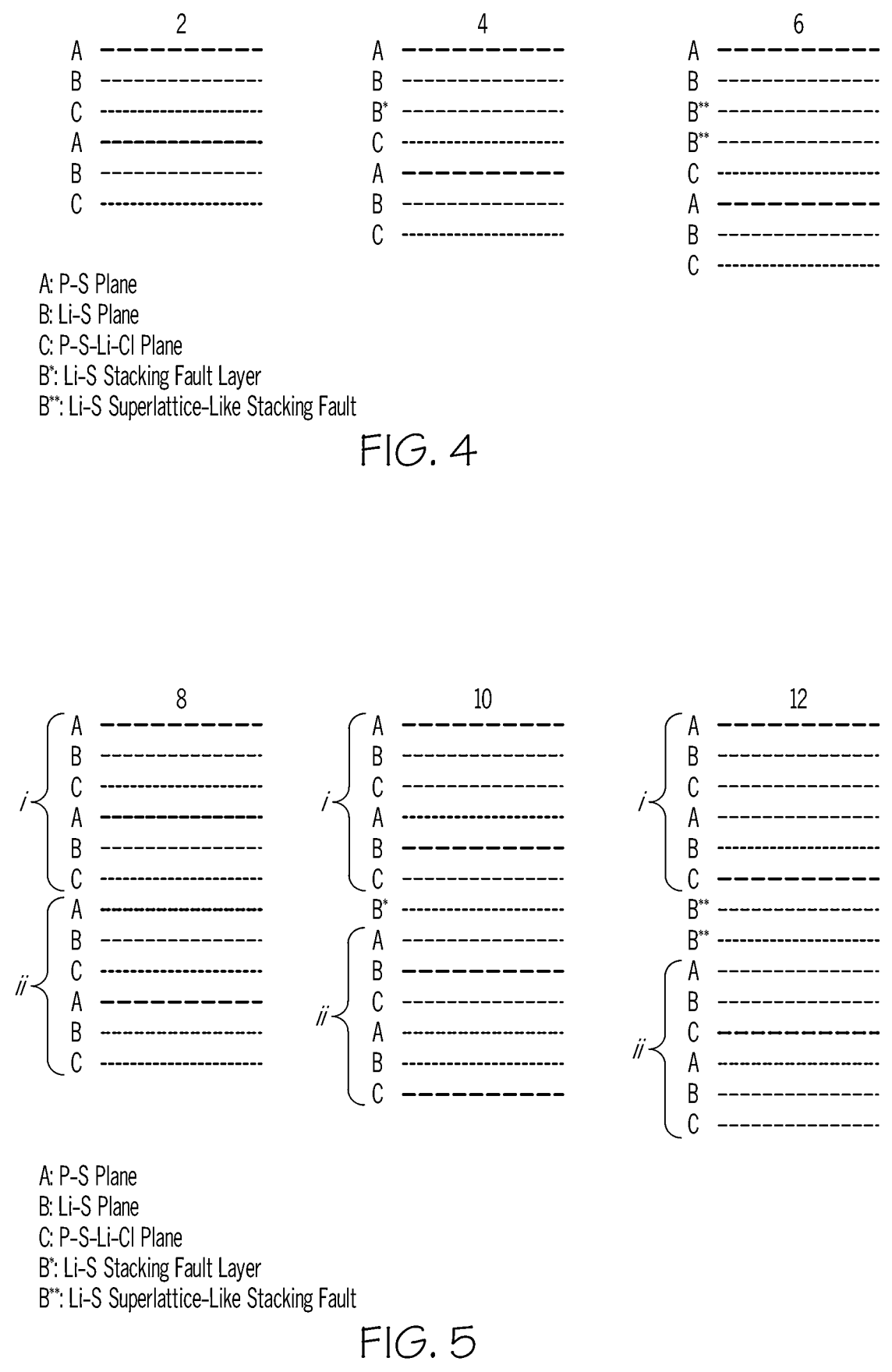

FIG. 4: A schematic representation of the unit cell for standard argyrodite with the general formula $Li_{7-x}PS_{6-x}Cl_x$ (2), where A is the phosphorous-sulfur (P-S) plane, B is the lithium-sulfide (Li—S) plane, and C is the phosphorous-sulfur-lithium-chloride (P—S—Li—Cl) plane. An excess lithium-sulfur (Li—S) stacking fault layer (B*) may be formed between the B and C planes (4) using high-temperature and/or high-pressure processing, forming stuffed argyrodite with the general formula $Li_{9-x}PS_{7-x}Cl_x$. Stuffed argyrodite may further comprise a superlattice-like stacking fault containing two or more lithium-sulfur (Li—S) stacking fault layers (B**) formed between the B and C planes (6), with the general formula $Li_{7-x+2n}PS_{6-x+n}Cl_x$, where n is the number of stacking fault layers inside the unit cell. Alternatively, one or more Li—S stacking fault layers may be formed between the A and B planes. In yet another alternative, one or more Li—S stacking fault layers may be formed between both the A and B planes and B and C planes.

In an alternative example, FIG. 4 may represent the unit cell of a Thio-LISCON solid-state electrolyte (2) with the general formula $Li_{10}MP_2S_{12}$, where A is the phosphorous mixed metal-sulfur ((P/M)-S) plane (where M may be Si, Ge, Sn, As, etc.), B is the lithium-sulfur (Li—S) plane, and C is the metal-phosphorous-sulfur-lithium (M-P—S—Li) plane. An excess lithium-sulfur (Li—S) stacking fault layer (B*) may be formed between the B and C planes (4) using high-temperature and/or high-pressure processing, forming stuffed Thio-LISCON with the general formula $Li_{12}MP_2S_{13}$. Stuffed Thio-LISCON may further comprise a superlattice-like stacking fault containing two or more lithium-sulfur (Li—S) stacking fault layers (B**) formed between the B and C planes (6), with the general formula $Li_{10+2n}MP_2S_{12+n}$, where n is the number of stacking fault layers inside the unit cell.

FIG. 5: A schematic representation of two neighboring unit cells (i and ii) for standard argyrodite with the general formula $Li_{7-x}PS_{6-x}Cl_x$ (8), where A is the phosphorous-sulfur (P—S) plane, B is the lithium-sulfide (Li—S) plane, and C is the phosphorous-sulfur-lithium-chloride (P—S—Li—Cl) plane. An excess lithium-sulfur (Li—S) stacking fault layer (B*) may be formed between the C plane of unit cell i and A plane of unit cell ii (10) using high-temperature and/or high-pressure processing, forming stuffed argyrodite with the general formula $Li_{9-x}PS_{7-x}Cl_x$. Stuffed argyrodite may further comprise a superlattice-like stacking fault containing two or more lithium-sulfur (Li—S) stacking fault layers (B**) formed between the C plane of unit cell i and A plane of unit cell ii (12), with the general formula $Li_{7-x+2n}PS_{6-x+n}Cl_x$, where n is the number of stacking fault layers between the unit cells.

In an alternative example, FIG. 5 may represent the unit cell of a Thio-LISCON solid-state electrolyte (8) with the general formula $Li_{10}MP_2S_{12}$, where A is the phosphorous mixed metal-sulfur ((P/M)-S) plane (where M may be Si, Ge, Sn, As, etc.), B is the lithium-sulfur (Li—S) plane, and C is the metal-phosphorous-sulfur-lithium (M-P—S—Li) plane. An excess lithium-sulfur (Li—S) stacking fault layer (B*) may be formed between the C plane of unit cell i and A plane of unit cell ii (10) using high-temperature and/or high-pressure processing, forming a stuffed Thio-LISCON with the general formula $Li_{12}MP_2S_{13}$. Stuffed Thio-LISCON may further comprise a superlattice-like stacking fault containing two or more lithium-sulfur (Li—S) stacking fault layers (B**) formed between the C plane of unit cell i and A plane of unit cell ii (12), with the general formula $Li_{10+2n}MP_2S_{12+n}$, where n is the number of stacking fault layers between the unit cells.

Figures 6, 7:
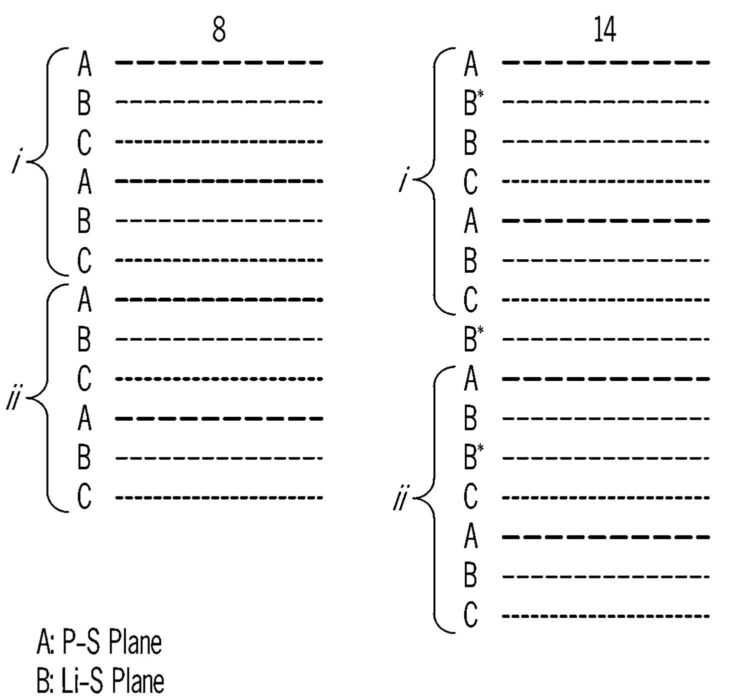
FIG. 6: A schematic representation of two standard neighboring unit cells and two standard neighboring unit cells with stacking faults.
FIG. 7: A schematic representation of standard unit cells and unit cells with stacking faults.

FIG. 6: A schematic representation of two neighboring unit cells (i and ii) for standard argyrodite with the general formula $Li_{7-x}PS_{6-x}Cl_x$ (8), where A is the phosphorous-sulfur (P—S) plane, B is the lithium-sulfide (Li—S) plane, and C is the phosphorous-sulfur-lithium-chloride (P—S—Li—Cl) plane. An excess lithium-sulfur (Li—S) stacking fault layer (B*) may be formed between the A and B planes in both unit cells and the C plane of unit cell i and A plane of unit cell ii (14) using high-temperature and/or high-pressure processing, forming stuffed argyrodite with the general formula $Li_{9-x}PS_{7-x}Cl_x$. Stuffed argyrodite may further comprise a superlattice-like stacking fault containing two or more lithium-sulfur (Li—S) stacking fault layers (B**) formed between the A and B planes in both unit cells and the C plane of unit cell i and A plane of unit cell ii (16), with the general formula $Li_{7-x+2n}PS_{6-x+n}Cl_x$, where n is the number of stacking fault layers inside and between the unit cells. Alternatively, one or more Li—S stacking fault layers may be formed between the B and C planes in both unit cells and the C plane of unit cell i and A plane of unit cell ii. In another alternative, one or more Li—S stacking fault layers may be formed between both the A and B planes and B and C planes in both unit cells, and the C plane of unit cell i and A plane of unit cell ii.

In an alternative example, FIG. 6 may represent the unit cell of a Thio-LISCON solid-state electrolyte (8) with the general formula $Li_{10}MP_2S_{12}$, where A is the phosphorous mixed metal-sulfur ((P/M)-S) plane (where M may be Si, Ge, Sn, As, etc.), B is the lithium-sulfur (Li—S) plane, and C is the metal-phosphorous-sulfur-lithium (M-P—S—Li) plane. An excess lithium-sulfur (Li—S) stacking fault layer (B*) may be formed between the A and B planes in both unit cells and the C plane of unit cell i and A plane of unit cell ii (14) using high-temperature and/or high-pressure processing, forming stuffed Thio-LISCON with the general formula $Li_{12}MP_2S_{13}$. Stuffed Thio-LISCON may further comprise a superlattice-like stacking fault containing two or more lithium-sulfur (Li—S) stacking fault layers (B**) formed between the A and B planes in both unit cells and the C plane of unit cell i and A plane of unit cell ii (16), with the general formula $Li_{10+2n}MP_2S_{12+n}$, where n is the number of stacking fault layers inside and between the unit cells.

FIG. 7: A schematic representation of the unit cell for standard argyrodite with the general formula $Li_{7-x}PS_{6-x}Cl_x$ (2), where A is the phosphorous-sulfur (P—S) plane, B is the lithium-sulfide (Li—S) plane, and C is the phosphorous-sulfur-lithium-chloride (P—S—Li—Cl) plane. A vacant lithium-sulfur ($V_{Li}$—S) stacking fault layer (V*) may be formed between the B and C planes (18) using high-temperature and/or high-pressure processing, forming stuffed argyrodite with the general formula $Li_{7-x}PS_{7-x}Cl_x$. Stuffed argyrodite may further comprise a superlattice-like stacking fault containing two or more vacant lithium-sulfur ($V_{Li}$—S) stacking fault layers (V**) formed between the B and C planes (20), with the general formula $Li_{7-x}PS_{6-x+n}Cl_x$, where n is the number of stacking fault layers inside the unit cell. Alternatively, one or more $V_{Li}$—S stacking fault layers may be formed between the A and B planes. In yet another alternative, one or more $V_{Li}$—S stacking fault layers may be formed between both the A and B planes and B and C planes.

In an alternative example, FIG. 7 may represent the unit cell of a Thio-LISCON solid-state electrolyte (2) with the general formula $Li_{10}MP_2S_{12}$, where A is the phosphorous mixed metal-sulfur ((P/M)-S) plane (where M may be Si, Ge, Sn, As, etc.), B is the lithium-sulfur (Li—S) plane, and C is the metal-phosphorous-sulfur-lithium (M-P—S—Li) plane. A vacant lithium-sulfur ($V_{Li}$—S) stacking fault layer (V*) may be formed between the B and C planes (18) using high-temperature and/or high-pressure processing, forming a stuffed Thio-LISCON with the general formula $Li_{10}MP_2S_{13}$. Stuffed Thio-LISCON may further comprise a superlattice-like stacking fault containing two or more vacant lithium-sulfur ($V_{Li}$—S) stacking fault layers (V**) formed between the B and C planes (20) with the general formula $Li_{10}MP_2S_{12+n}$, where n is the number of stacking fault layers inside the unit cell.

Figures 8, 9:
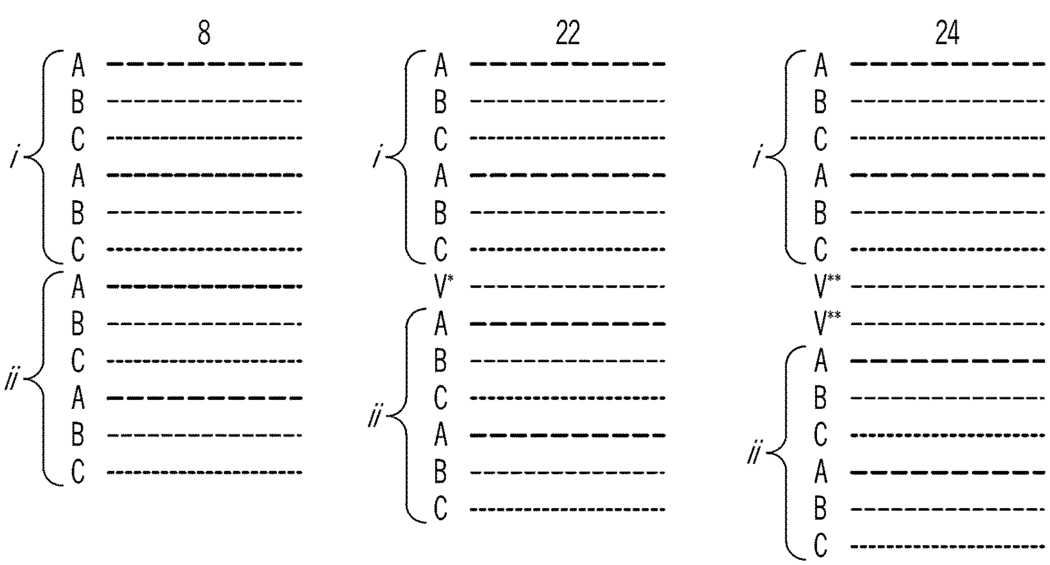
FIG. 8: A schematic representation of two standard neighboring unit cells and two standard neighboring unit cells with stacking faults.
FIG. 9: A schematic representation of two standard neighboring unit cells and two standard neighboring unit cells with stacking faults.

FIG. 8: A schematic representation of two neighboring unit cells (i and ii) for standard argyrodite with the general formula $Li_{7-x}PS_{6-x}Cl_x$ (8), where A is the phosphorous-sulfur (P—S) plane, B is the lithium-sulfide (Li—S) plane, and C is the phosphorous-sulfur-lithium-chloride (P—S—Li—Cl) plane. A vacant lithium-sulfur ($V_{Li}$—S) stacking fault layer (V*) may be formed between the C plane of unit cell i and A plane of unit cell ii (22) using high-temperature and/or high-pressure processing, forming stuffed argyrodite with the general formula $Li_{7-x}PS_{7-x}Cl_x$. Stuffed argyrodite may further comprise a superlattice-like stacking fault containing two or more vacant lithium-sulfur ($V_{Li}$—S) stacking fault layers (V**) formed between the C plane of unit cell i and A plane of unit cell ii (24), with the general formula $Li_{7-x}PS_{6-x+n}Cl_x$, where n is the number of stacking fault layers between the unit cells.

In an alternative example, FIG. 8 may represent the unit cell of a Thio-LISCON solid-state electrolyte (8) with the general formula $Li_{10}MP_2S_{12}$, where A is the phosphorous mixed metal-sulfur ((P/M)-S) plane (where M may be Si, Ge, Sn, As, etc.), B is the lithium-sulfur (Li—S) plane, and C is the metal-phosphorous-sulfur-lithium (M-P—S—Li) plane. A vacant lithium-sulfur ($V_{Li}$—S) stacking fault layer (V*) may be formed between the C plane of unit cell i and A plane of unit cell ii (22) using high-temperature and/or high-pressure processing, forming a stuffed Thio-LISCON with the general formula $Li_{10}MP_2S_{13}$. Stuffed Thio-LISCON may further comprise a superlattice-like stacking fault containing two or more vacant lithium-sulfur ($V_{Li}$—S) stacking fault layers (V**) formed between the C plane of unit cell i and A plane of unit cell ii (24), with the general formula $Li_{10}MP_2S_{12+n}$, where n is the number of stacking fault layers between the unit cells.

FIG. 9: A schematic representation of two neighboring unit cells (i and ii) for standard argyrodite with the general formula $Li_{7-x}PS_{6-x}Cl_x$ (8), where A is the phosphorous-sulfur (P—S) plane, B is the lithium-sulfide (Li—S) plane, and C is the phosphorous-sulfur-lithium-chloride (P—S—Li—Cl) plane. A vacant lithium-sulfur ($V_{Li}$—S) stacking fault layer (V*) may be formed between the A and B planes in both unit cells and the C plane of unit cell i and A plane of unit cell ii (26) using high-temperature and/or high-pressure processing, forming stuffed argyrodite with the general formula $Li_{7-x}PS_{7-x}Cl_x$. Stuffed argyrodite may further comprise a superlattice-like stacking fault containing two or more vacant lithium-sulfur ($V_{Li}$—S) stacking fault layers (V) formed between the A and B planes in both unit cells and the C plane of unit cell i and A plane of unit cell ii (28), with the general formula $Li_{7-x}PS_{6-x+n}Cl_x$, where n is the total number of stacking fault layers inside and between the unit cells. Alternatively, one or more Vu-S stacking fault layers may be formed between the B and C planes in both unit cells and the C plane of unit cell i and A plane of unit cell ii. In another alternative, one or more $V_{Li}$—S stacking fault layers may be formed between both the A and B planes and B and C planes in both unit cells, and the C plane of unit cell i and A plane of unit cell In an alternative example, FIG. 9** may represent the unit cell of a Thio-LISCON solid-state electrolyte (8) with the general formula $Li_{10}MP_2S_{12}$, where A is the phosphorous mixed metal-sulfur ((P/M)-S) plane (where M may be Si, Ge, Sn, As, etc.), B is the lithium-sulfur (Li—S) plane, and C is the metal-phosphorous-sulfur-lithium (M-P—S—Li) plane. A vacant lithium-sulfur ($V_{Li}$—S) stacking fault layer (V*) may be formed between the A and B planes in both unit cells and the C plane of unit cell i and A plane of unit cell ii (26) using high-temperature and/or high-pressure processing, forming stuffed Thio-LISCON with the general formula $Li_{10}MP_2S_{13}$. Stuffed Thio-LISCON may further comprise a superlattice-like stacking fault containing two or more vacant lithium-sulfur ($V_{Li}$—S) stacking fault layer (V**) formed between the A and B planes in both unit cells and the C plane of unit cell i and A plane of unit cell ii (28), with the general formula $Li_{10}MP_2S_{12+n}$, where n is the total number of stacking fault layers inside and between the unit cells.

Figure 10:
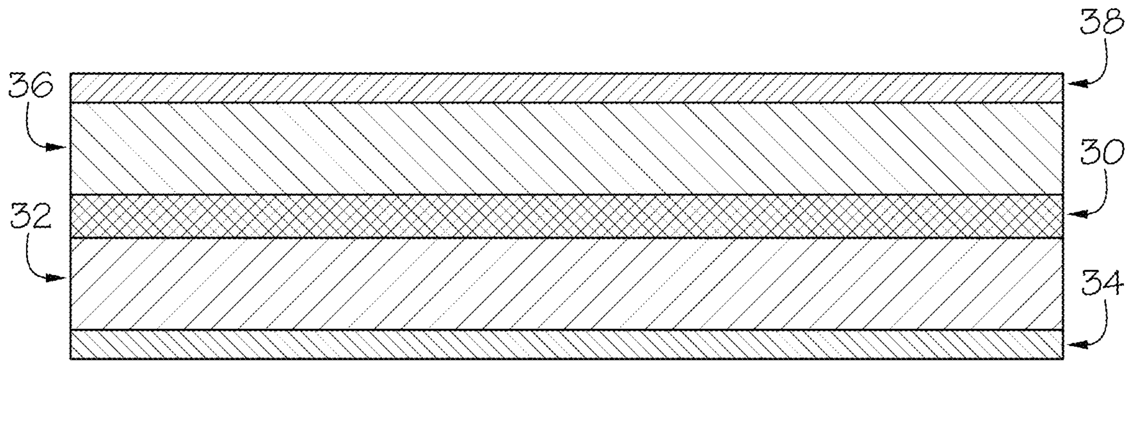
FIG. 10: A schematic representation of a solid-state battery using stuffed argyrodite of the present description as the solid-state electrolyte layer.

FIG. 10: A schematic representation of a solid-state battery using stuffed argyrodite as the solid-state electrolyte layer (30), wherein the electrolyte layer separates the composite cathode layer (32), formed onto a positive current collector (34), and a composite anode layer (36), formed onto a negative current collector (38). A composite cathode layer (32) may contain stuffed argyrodite in the form of a catholyte. A composite anode layer (36) may contain stuffed argyrodite in the form of an anolyte.

Figure 11:
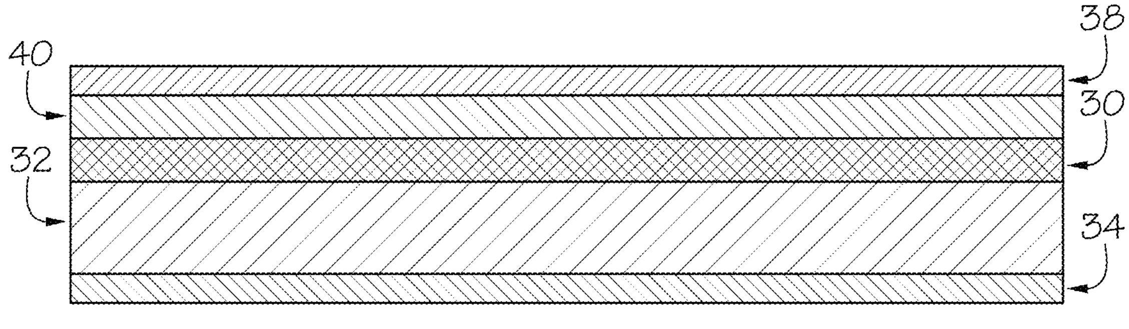
FIG. 11: A schematic representation of a solid-state lithium metal battery using stuffed argyrodite of the present description as the solid-state electrolyte layer.

FIG. 11: A schematic representation of a solid-state lithium metal battery using stuffed argyrodite as the solid-state electrolyte layer (30), wherein the electrolyte layer separates the composite cathode layer (32), formed onto a positive current collector (34), and a lithium metal anode layer (40), formed onto a negative current collector (38). A composite cathode layer (32) may contain stuffed argyrodite in the form of a catholyte.

Figure 12:
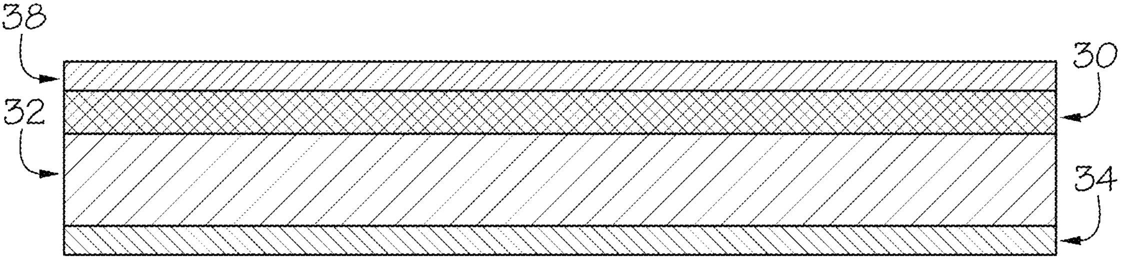
FIG. 12: A schematic representation of a solid-state anodeless battery using stuffed argyrodite of the present description as the solid-state electrolyte layer.

FIG. 12: A schematic representation of a solid-state anodeless battery using stuffed argyrodite as the solid-state electrolyte layer (30), wherein the electrolyte layer separates the composite cathode layer (32), formed onto a positive current collector (34), and a negative current collector (38). A composite cathode layer (32) may contain stuffed argyrodite in the form of a catholyte.

Additional details relating to the structures of the present description and methods for manufacturing and using the structures of the present description are described as follows. Although the following detailed description is primarily focused on argyrodite structures having excess sulfur or excess lithium sulfide, the principles would apply to non-argyrodite structures and structures having excess chalcogens other than sulfur or excess chalcogenide other than lithium sulfide.

In the case of excess sulfur, argyrodite precursor formulations comprising excess sulfur powder may be annealed via solid-state reaction in a closed system to form a sufficiently high sulfur vapor pressure. The high vapor pressure may force the excess sulfur to fill sulfur vacancies, or form sulfur interstitials, or form superlattice stacking faults. Superlattice stacking faults may be formed by a mixture of regular sulfur-lithium lattices and sulfur-lithium vacancy pairs.

In the case of excess lithium sulfide, argyrodite precursor formulations comprising excess lithium sulfide powder may be annealed via solid-state reaction in a closed system to form a sufficiently high lithium sulfide vapor pressure. The high vapor pressure may allow the formation of superlattice stacking faults of one or more $Li_2S$ layers.

Sulfur stuffed argyrodite may reduce the electronic conductivity of argyrodite, expand the electrochemical window of a secondary battery using argyrodite as an electrolyte, or increase the ionic conductivity of argyrodite.

Argyrodite structured solid-state electrolytes are advantageous in secondary batteries, particularly solid-state batteries, owing to their high room temperature ionic conductivity. However, sulfur vacancies can increase the electronic conductivity of argyrodite, resulting in metal dendrite growth that can penetrate through leading to battery shorting. The sulfur vacancies can also restrict the electrochemical window of a battery that uses argyrodite as an electrolyte, limiting energy density. Battery performance may be enhanced by filling the sulfur vacancies in the argyrodite with excess sulfur.

In an embodimenI⁻, an argyrodite solid-state electrolyte material may have the general formula: $Li_{12-m-x}(M^{m+}Y_4^{2-})Y_{2-x}^{2-}X_x^-$ or $Li_{18-2m-x}(M_2^{m+}Y_7^{2-})Y_{2-x}^{2-}X_{x-}$, where $M^{m+}=B^{3+}$, $Ga^{3+}$, $Sb^{3+}$, $Si^{4+}$, $Ge^{4+}$, $Sn^{4+}$, $P^{5+}$, $As^{5+}$, or a combination thereof; where $Y^{2-}=S^{2-}$, and in some instances may also be in combination with $O^{2-}$, $S^{2-}$, $Te^{2-}$, or a combination thereof; where $X^-=F^-$, $Cl^-$, $Br^-$, $I^-$, or a combination thereof; and where x is in the range of $0 \leq x \leq 2$.

In another embodiment, excess sulfur may be integrated into an argyrodite material forming a sulfur-stuffed argyrodite structure. In an aspect, excess sulfur may be used to fill sulfur vacancies in argyrodite, forming sulfur-stuffed argyrodite. In another aspect, excess sulfur may be used to form sulfur interstitials in argyrodite, forming sulfur-stuff argyrodite.

In yet another aspect, excess sulfur may be used to form superlattice stacking faults in the argyrodite structure, forming sulfur-stuff argyrodite. The superlattice stacking faults may be formed by sulfur-lithium vacancy pairs with regular sulfur-lithium lattices.

In yet another aspect, sulfur-stuffed argyrodite, with excess sulfur, may appear as a single (111) peak corresponding to $Li_2S$ in X-Ray diffraction patterns, which is the close-pack plane for lithium and sulfur atoms. The $Li_2S$ peak intensity may be greater than 3% of the peak intensities for the sulfide-based ionic-conductive argyrodite structure. Alternatively, such structures can be observed using transmission electron microscopy (TEM) or high resolution transmission electron microscopy (HRTEM).

In yet another aspect, a high-pressure annealing process in a closed system may be used to increase the sulfur vapor pressure, forcing excess sulfur into the argyrodite structure, forming sulfur-stuffed argyrodite.

In yet another embodiment, a sulfur-stuffed argyrodite structure, with excess sulfur, may have the general formula: $Li_{12-m-x}M^{m+}Y_{(6-x)+n}X_x$ or $Li_{18-2m-x}M_2^{m+}Y_{(9-x)+n}X_x$, where $M^{m+}=B^{3+}$, $Ga^{3+}$, Sb', $Si^{4+}$, $Ge^{4+}$, $Sn^{4+}$, $P^{5+}$, $As^{5+}$, or a combination thereof; where $Y=S^{2-}$, and in some instances may also be in combination with $O^{2-}$, $S^{2-}$, $Te^{2-}$, or a combination thereof; where $X^-=F^-$, $Cl^-$, $Br^-$, $I^-$, or a combination thereof; where x is in the range of $0\leq x\leq 2$; and where n is >0, preferably where n is >0.01, more preferably in the range of $0.01<n\leq 1$.

In an aspect, a sulfur-stuffed argyrodite, with excess sulfur, may have an argyrodite formulation consisting of phosphorus and one or more halogens.

In another aspect, a sulfur-stuffed argyrodite, with excess sulfur, may have an argyrodite formulation consisting of a phosphorus mixture and one or more halogens.

In yet another aspect, a sulfur-stuffed argyrodite, with excess sulfur, may have an argyrodite formulation consisting of a non-phosphorous element and one or more halogens.

In yet another aspect, a sulfur-stuffed argyrodite, with excess sulfur, may have an argyrodite formulation consisting of a non-phosphorus mixture and one or more halogens.

In yet another embodiment, excess lithium sulfide may be integrated into an argyrodite material, forming a sulfur-stuffed argyrodite structure.

In an aspect, excess lithium sulfide may be integrated into the argyrodite material, wherein the excess lithium sulfide may form superlattice stacking faults of one or more $Li_2S$ layers.

In an aspect, the planes of superlattice stacking faults may appear as a single (111) peak corresponding to Li2S in X-ray diffraction patterns, which is the close-pack plane for lithium and sulfur atoms. The Li2S peak intensity may be greater than 3% of the peak intensities for the sulfide-based ionic-conductive argyrodite structure. Alternatively, such structures can be observed using transmission electron microscopy (TEM) or high resolution transmission electron microscopy (HRTEM).

In another aspect, a high-pressure annealing process in a closed system may be used to increase the lithium sulfide vapor pressure, forcing excess lithium sulfide into the argyrodite structure, forming sulfur-stuffed argyrodite.

In yet another embodiment, a sulfur-stuffed argyrodite structure, with excess lithium sulfide, may have the general formula: $Li_{12-m-x+2n}M^{m+}Y_{(6-x)+n}X_x$ or $Li_{18-2m-x+2n}M_2^{m+Y}{}_{(9-x)+n}X_x$, where $M^{m+}=B^{3+}$, $Ga^{3+}$, $Sb^{3+}$, $Si^{4+}$, $Ge^{4+}$, $Sn^{4+}$, $P^{5+}$, $As^{5+}$, or a combination thereof; where $Y=S^{2-}$, and in some instances may also be in combination with $O^{2-}$, $S^{2-}$, $Te^{2-}$, or a combination thereof; where $X^-=F^-$, $Cl^-$, $Br^-$, $I^-$, or a combination thereof; where x is in the range of $0\leq x\leq 2$; and where n is >0, preferably where n is >0.01, more preferably in the range of $0.3<n\leq 20$.

In an aspect, a sulfur-stuffed argyrodite, with excess lithium sulfide, may have an argyrodite formulation consisting of phosphorus and one or more halogens.

In another aspect, a sulfur-stuffed argyrodite, with excess lithium sulfide, may have an argyrodite formulation consisting of a phosphorus mixture and one or more halogens.

In yet another aspect, a sulfur-stuffed argyrodite, with excess lithium sulfide, may have an argyrodite formulation consisting of a non-phosphorous element and one or more halogens.

In yet another aspect, a sulfur-stuffed argyrodite, with excess lithium sulfide, may have an argyrodite formulation consisting of a non-phosphorus mixture and one or more halogens.

In yet another embodiment, sulfur-stuffed argyrodites may be used to enhance the performance of secondary batteries, particularly solid-state batteries.

In an aspect, sulfur-stuffed argyrodites may be used to reduce the electronic conductivity of the solid-state electrolyte.

In another aspect, sulfur-stuffed argyrodites may be used to increase the ionic conductivity of the solid-state electrolyte.

In yet another aspect, sulfur-stuffed argyrodites may be used to expand the electrochemical potential window of the secondary battery that uses argyrodite as a solid-state electrolyte.

In yet another aspect, sulfur-stuffed argyrodites may be used to enhance the chemically compatibly of argyrodite with active cathode materials and other materials in a secondary battery.

In yet another aspect, sulfur-stuffed argyrodites may be used to block lithium dendrite penetration enhancing secondary battery cycle life.

In yet another aspect, sulfur-stuffed argyrodite may be used to enhance the critical current density of the solid-state electrolyte, and thus increasing the power rate a solid-state secondary battery.

The present disclosure relates to a solid-state electrolyte material.

A solid-state electrolyte may include or is formed from a solid-state ionic conductive material. A solid-state ionic conductive material can be described as a material that may have the following characteristics:

A solid-state ionic conductive material is a type of material that can selectively allow a specific charged element to pass through under a presence of an electric field or chemical potential, such as concentration differences.

While this solid-state ionic conductive material allows ions to migrate through, it may not allow electrons to pass easily.

The ions may carry 1, 2, 3, 4 or more positive charges. Examples of the charged ions include for example $H^+$, $Li^+$, $Na^+$, $K^+$, $Ag^+$, $Mg^{2+}$, $Zn^{2+}$, $Al^{3+}$, $Fe^{3+}$, etc.

The ionic conductivity of the corresponding ions is preferably to be $>10^{-7}$ S/cm. It is preferably to have lower electronic conductivity ($<10^{-7}$ S/cm).

A solid-state ionic conductive material may include, for example, an argyrodite material the general formula: $Li_{12-m-x}(M^{m+}Y_4^{2-})Y_{2-x}^{2-}X_x^{-}$ or $Li_{18-m-x}(M_2^{m+}Y_7^{2-})Y_{2-x}^{2-}X_{x-}$ a) where $M^{m+}$ may include boron ($B^{3+}$), gallium ($Ga^{3+}$), aluminum ($Al^{3+}$), antimony ($Sb^{3+}$), silicon ($Si^{4+}$), germanium ($Ge^{4+}$), phosphorous ($P^{5+}$), arsenic ($As^{5+}$), or a combination thereof.

b) where $Y^{2-}$ is sulfur ($S^{2-}$), and in some instances may also be in combination with other nonmetal chalcogen elements such as oxygen ($O^{2-}$), selenium ($Se^{2-}$), tellurium ($Te^{2-}$), or a combination thereof.

c) where $X^{-}$ is a halogen such as fluorine ($F^{-}$), chlorine ($Cl^{-}$), bromide ($Br^{-}$, iodine ($I^{-}$),or a combination thereof, and where x is in the range of $0 \le x \le 2$.

The present disclosure relates to the processing of sulfur-stuffed argyrodites with excess sulfur.

A synthesis for sulfur-stuffed argyrodite may include, for example, a solid-state reaction, wherein excess elemental sulfur is added to a ceramic powder mixture prior to the synthesis to form sulfur-stuffed argyrodite.

A solid-state synthesis for sulfur-stuffed argyrodite may include, for example, high temperature annealing in a closed system, wherein high sulfur vapor pressure drives or forces excess sulfur into the argyrodite structure, forming sulfur-stuffed argyrodite.

Annealing temperature may be in the range of $100 \le T \le 1000°$ C.

A solid-state synthesis for sulfur-stuffed argyrodite may have the parameters sufficient to integrate excess sulfur into the argyrodite structure, forming the sulfur-stuffed argyrodite.

Any synthesis method not disclosed may use an excess amount of sulfur to form sulfur-stuffed argyrodite, wherein the parameters of the synthesis method are sufficient to drive or force excess sulfur into argyrodite structure, to form sulfur-stuffed argyrodite.

The present disclosure relates to the composition of sulfur-stuffed argyrodite with excess sulfur.

Sulfur-stuffed argyrodite, with excess sulfur integrated into the argyrodite structure, may have the general formula:

$Li_{12-m-x}M^{m+}Y_{(6-x)+n}X_x$, where $M^{m+}=B^{3+}$, $Ga^{3+}$, $Sb^{3+}$, $Si^{4+}$, $Ge^{4+}$, $Sn^{4+}$, $P^{5+}$, $As^{5+}$, or a combination thereof; where $Y=S^{2-}$, and in some instances may also be in combination with $O^{2-}$, $S^{2-}$, $Te^{2-}$, or a combination thereof; where $X^{-}=F^{-}$, $Cl^{-}$, $Br^{-}$, $I^{-}$, or a combination thereof; where x is in the range of $0 \le x \le 2$; and where n is >0, preferably where n is >0.01, more preferably in the range of $0.01 < n \le 1$.

A sulfur-stuffed argyrodite, with excess sulfur, may include, for example, an argyrodite composition with phosphorus and a single halogen with the formula:

$Li_{7-x}PS_{(6-x)+n}X_x$; where X is a halogen element and x is in the range of $0 \le x \le 2$. A formulation may include, for example, $Li_6PS_{5+n}Cl$, $Li_{6.25}PS_{5.25+n}Br_{0.75}$, $Li_{5.75}PS_{4.75+n}I_{1.25}$, etc., where n is >0, preferably where n is >0.01, more preferably in the range of $0.01 < n \le 1$.

A sulfur-stuffed argyrodite, with excess sulfur, may include, for example, an argyrodite composition with phosphorous and more than one halogen with the formula:

$Li_{7-x'-x''}PS_{(6-x'-x'')+n}X'_{x'}X''_{x''}$; where X' and X" are two different halogen elements and x'+x"≤2. A formulation may include, for example, $Li_6PS_{5+n}Cl_{0.5}$Br0.5, $Li_{5.75}PS_{4.75+n}Cl_{0.75}I_{0.5}$, $Li_{6.25}PS_{5.25+n}I_{0.5}Br_{0.25}$, etc., where n is >0, preferably where n is >0.01, more preferably in the range of $0.01 < n \le 1$.

A sulfur-stuffed argyrodite, with excess sulfur, may include, for example, an argyrodite composition with a phosphorus mixture and a single halogen with the formula:

$Li_{12-((5+m)/2)-x}M_y^{m+}P_{1-y}S_{(6-x)+n}X_x$; where $M^{m+}$ is a positively charged ion other than phosphorous, X is a halogen element and x is in the range of $0 \le x \le 2$. A formulation may include, for example, $Li_7Sb_yP_{1-y}S_{5+n}Cl$, $Li_{6.5}Si_yP_{1-y}S_{5+n}Br^{-}$, $Li_6Sn_yP_{1-y}S_{4.5+n}Cl_{1.5}$, $Li_6As_y$, $P_{1-y}S_{5+n}I$, etc., where y is in the range of $0.001 < y < 0.999$ and n is >0, preferably where n is >0.01, more preferably in the range of $0.01 < n \le 1$.

A sulfur-stuffed argyrodite, with excess sulfur, may include, for example, an argyrodite composition with a phosphorous mixture and more than one halogen with the formula:

$Li_{12-((5+m)/2)-x'-x''}M_y^{m+}P_{1-y}S_{(6-x'-x'')+n}X'_{x'}X''_{x''}$; where X' and X" are two different halogens and x'+x"≤2. A formulation may include, for example, $Li_7B_yP_{1-y}S_{5+n}Cl_{0.5}Br_{0.5}$, $Li_{6.75}Sb_yP_{1-y}S_{4.75+n}Cl_{0.5}I_{0.75}$, $Li_6Si_yP_yS_{4.5+n}Cl_{0.75}Br_{0.75}$, $Li_{16.5}Sn_yP_yS_{5+n}Br_{0.5}I_{0.5}$, etc., where y is in the range of $0.001 \le y \le 0.999$ and n is >0, preferably where n is >0.01, more preferably in the range of $0.01 < n \le 1$.

A sulfur-stuffed argyrodite, with excess sulfur, may include, for example, a single non-phosphorus argyrodite composition with a single halogen with the formula:

$Li_{12-m-x}M^{m+S}{}_{(6-x)+n}X_x$; where $M^{m+}$ is a positively charged ion other than phosphorous, X is a halogen element and x is in the range of $0 \le x \le 2$. A formulation may include, for example, $Li_8BS_{5+n}Cl$, $Li_{7.5}SbS_{4.5+n}Br_{1.5}$, $Li_7SiS_{5+n}I$, $Li_{7.25}SnS_{5.25+n}Cl_{0.75}$, $Li_{5.75}AsS_{4.75+n}Br_{1.25}$, etc., where n is >0, preferably where n is >0.01, more preferably in the range of $0.01 < n \le 1$.

A sulfur-stuffed argyrodite, with excess sulfur, may include, for example, a single non-phosphorous argyrodite composition with more than one halogen with the formula:

$Li_{12-m-x'-x''M}{}^{m+S}{}_{(6-x'-x'')+n}X'_{x'}X''_{x''}$; where $M^{m+}$ is a positively charged ion other than phosphorous, X' and X" are two different halogens elements and x'+x"≤2. A formulation may include, for example, $Li_8SbS_{5+n}Cl_{0.5}Br_{0.5}$, $Li_{6.75}SiS_{4.75+n}Cl_{0.75}Br_{0.5}$, $Li_7SnS_{5+n}Cl_{0.5}Br_{0.5}$, $Li_{5.5}AsS_{4.5+n}Br_{0.75}I_{0.75}$, etc., where n is >0, preferably where n is >0.01, more preferably in the range of $0.01 < n \le 1$.

A sulfur-stuffed argyrodite, with excess sulfur, may include, for example, an argyrodite composition with a non-phosphorous mixture and a single halogen with the formula:

$Li_{12-((m'+m'')/2)-x}M_y^{m'}M_{1-y}^{m''}S_{(6-x)+n}X_x$; where $M^{m'}$ and $M^{m''}$ are two different positively charged ions other than phosphorous, X is a halogen element and x is in the range of $0 \le x \le 2$. A formulation may include, for example, $Li_8B_ySb_{1-y}S_{5+n}Cl$, $Li_{7.2}Sb_ySi_{1-y}S_{4.75+n}Br_{1.3}$, $Li_{7.25}Si_ySn_{1-y}S_{5.25+n}I_{0.75}$, $Li_{6.5}B_yAS_{1-y}S_{4.5+n}Cl_{1.5}$, $Li_{6.25}Si_yAs_{1-y}S_{4.75+n}Br_{1.25}$, etc. where y is in the range of $0.001 \le y \le 0.999$ and n is >0, preferably where n is >0.01, more preferably in the range of $0.01 < n \le 1$.

A sulfur-stuffed argyrodite, with excess sulfur, may include, for example, an argyrodite composition with a non-phosphorous mixture and more than one halogen with the formula:

$Li_{12-((m'+m'')/2)-x'-x''}M_y^{m'}M_{1-y}^{m''}S_{(6-x'-x'')+n}X'_{x'}X''_{x''}$; where $M^{m'}$ and $M^{m''}$ are two different positively charged ions other than phosphorous, X' and X" are two different halogens elements and x'+x"≤2. A formulation may include, for example, $Li_8Ga_ySb_{1-y}S_{5+n}Cl_{0.5}Br_{0.5}$, $Li_{7.25}Sb_ySi_{1-y}S_{4.75+n}Cl_{0.75}Br_{0.5}$, $Li_7Si_yGe_{1-y}S_{5+n}Cl_{b\ 0.5}I_{0.5}$, $Li_{6.85}Sn_{1-y}Si_{1-y}S_{4.85+n}Cl_{0.7}I_{0.45}$, $Li_6As_ySn_{1-y}S_{4.5+n}I_{0.75}Br_{0.75}$, where y is in the range of $0.001 \le y \le 0.999$ and n is >0, preferably where n is >0.01, more preferably in the range of $0.01 < n \le 1$.

Sulfur-stuffed argyrodite, with excess sulfur integrated into the argyrodite structure, may have the general formula:

$Li_{18-2m-x}M_2^{m+}Y_{(9-x)+n}X_x$, where $M^{m+}=B^{3+}$, $Ga^{3+}$, $Sb^{3+}$, $Si^{4+}$, $Ge^{4+}$, $Sn^{4+}$, $P^{5+}$, $As^{5+}$, or a combination thereof; where $Y=S^{2-}$, and in some instances may also be in combination with $O^{2-}$, $S^{2-}$, $Te^{2-}$, or a combination thereof; where $X^-=F^-$, $Cl^-$, $Br^-$, $I^-$, or a combination thereof; where x is in the range of $0\leq x\leq 2$; and where n is >0, preferably where n is >0.01, more preferably in the range of $0.01<n\leq 1$.

A sulfur-stuffed argyrodite, with excess sulfur, may include, for example, an argyrodite composition with phosphorus and a single halogen with the formula:

$Li_{8-x}P_2S_{(9-x)+n}X_x$; where X is a halogen element and x is in the range of $0\leq x\leq 2$. A formulation may include, for example, $Li_7P_2S_{8+n}Cl$, $Li_{7.25}P_2S_{8.25+n}Br_{0.75}$, $Li_{6.75}P_2S_{7.75+n}I_{1.25}$, etc., where n is >0, preferably where n is >0.01, more preferably in the range of $0.01<n\leq 1$.

A sulfur-stuffed argyrodite, with excess sulfur, may include, for example, an argyrodite composition with phosphorous and more than one halogen with the formula:

$Li_{8-x'-x''}P_2S_{(9-x'-x'')+n}X'x'X''x''$; where X' and X'' are two different halogen elements and $x'+x''\leq 2$. A formulation may include, for example, $Li_7P_2S_{8+n}Cl_{0.5}Br_{0.5}$, $Li_{6.75}P_2S_{7.75+n}Cl_{0.75}I_{0.5}$, $Li_{7.25}P_2S_{8.25+n}I_{0.5}Br_{0.25}$, etc., where n is >0, preferably where n is >0.01, more preferably in the range of $0.01<n<1$.

A sulfur-stuffed argyrodite, with excess sulfur, may include, for example, an argyrodite composition with a phosphorus mixture and a single halogen with the formula:

$Li_{18-(5+m)-x}M_y^{m+}P_{2-y}S_{(9-x)+n}X_x$; where $M^{m+}$ is a positively charged ion other than phosphorous, X is a halogen element and x is in the range of $0\leq x\leq 2$. A formulation may include, for example, $Li_9Sb_yP_{2-y}S_{8+n}Cl$, $Li_8Si_yP_{2-y}S_{8+n}Br^-$, $Li_{7.5}Sn_yP_{2-y}S_{7.5+n}Cl_{1.5}$, $Li_7As_yP_{2-y}S_{8+n}I$, etc., where y is in the range of $0.001\leq y\leq 1.999$ and n is >0, preferably where n is >0.01, more preferably in the range of $0.01<n\leq 1$.

A sulfur-stuffed argyrodite, with excess sulfur, may include, for example, an argyrodite composition with a phosphorous mixture and more than one halogen with the formula:

$Li_{18-(5+m)-x'-x''}M_y^{m+}P_{2-y}S_{(9-x'-x'')+n}X'_{x'}X''_{x''}$; where X' and X'' are two different halogens and $x'+x''\leq 2$. A formulation may include, for example, $Li_9B_yP_{2-y}S_{8+n}Cl_{0.5}Br_{0.5}$, $Li_{8.75}Sb_yP_{2-y}S_{7.75+n}Cl_{0.5}I_{0.75}$, $Li_{7.5}Si_yP_{2-y}S_{3.5+n}Cl_{0.75}Br_{0.75}$, $Li_8Sn_yP_{2-y}S_{8+n}Br_{0.5}I_{0.5}$, etc., where y is in the range of $0.001\leq y\leq 1.999$ and n is >0, preferably where n is >0.01, more preferably in the range of $0.01<n\leq 1$.

A sulfur-stuffed argyrodite, with excess sulfur, may include, for example, a single non-phosphorus argyrodite composition with a single halogen with the formula:

$Li_{18-2m-x}M_2^{m+}S_{(9-x)+n}X_x$; where $M^{m+}$ is a positively charged ion other than phosphorous, X is a halogen element and x is in the range of $0\leq x\leq 2$. A formulation may include, for example, $Li_{11}B_2S_{8+n}Cl$, $Li_{10.5}Sb_2S_{7.5+n}Br_{1.5}$, $Li_9Si_2S_{8+n}I$, $Li_{9.25}Sn_2S_{8.25+n}Cl_{0.75}$, $Li_{6.75}As_2S_{7.75+n}Br_{1.25}$, etc., where n is >0, preferably where n is >0.01, more preferably in the range of $0.01<n\leq 1$.

A sulfur-stuffed argyrodite, with excess sulfur, may include, for example, a single non-phosphorous argyrodite composition with more than one halogen with the formula:

$Li_{18-2m-x'-x''}M_2^{m+}S_{(9-x'-x'')+n}X'_{x'}X''_{x''}$; where $M^{m+}$ is a positively charged ion other than phosphorous, X' and X'' are two different halogens elements and $x'+x''\leq 2$. A formulation may include, for example, $Li_{11}Sb_2S_{8+n}Cl_{0.5}Br0.5$, $Li_{8.75}Si_2S_{7.75+n}Cl_{0.75}Br_{0.5}$, $Li_9Sn_2S_{8+n}Cl_{0.5}Br_{0.5}$, $Li_{6.5}As_2S_{7.5+n}Br_{0.75}$, etc., where n is >0, preferably where n is >0.01, more preferably in the range of $0.01<n\leq 1$.

A sulfur-stuffed argyrodite, with excess sulfur, may include, for example, an argyrodite composition with a non-phosphorous mixture and a single halogen with the formula:

$Li_{18-(m'+m'')-x}M_y^{m'}M_{2-y}^{m''}S_{(9-x)+n}X_x$; where $M^{m'}$ and $M^{m''}$ are two different positively charged ions other than phosphorous, X is a halogen element and x is in the range of $0\leq x\leq 2$. A formulation may include, for example, $Li_{11}B_ySb_{2-y}S_{8+n}Cl$, $Li_{9.7}Sb_ySi_{2-y}S_{7.7+n}Br_{1.3}$, $Li_{9.25}Si_ySn_{2-y}S_{8.25+n}I_{0.75}$, $Li_{8.5}B_yAs_{2-y}S_{7.5+n}Cl_{1.5}$, $Li_{7.75}Si_yAs_{2-y}S_{7.75+n}Br_{1.25}$, etc. where y is in the range of $0.001\leq y\leq 1.999$ and n is >0, preferably where n is >0.01, more preferably in the range of $0.01<n\leq 1$.

A sulfur-stuffed argyrodite, with excess sulfur, may include, for example, an argyrodite composition with a non-phosphorous mixture and more than one halogen with the formula:

$Li_{18-(m'+m'')-x'-x''}M_y^{m'}M_{2-y}^{m''}S_{(9-x'-x'')+n}X'_{x'}X''_{x''}$; where $M^{m'}$ and Mm'' are two different positively charged ions other than phosphorous, X' and X'' are two different halogens elements and $x'+x''\leq 2$. A formulation may include, for example, $Li_{11}Ga_ySb_{2-y}S_{8+n}Cl_{0.5}Br_{0.5}$, $Li_{9.75}Sb_ySi_{2-y}S_{7.75+n}Cl_{0.75}Br0.5$, $Li_9Si_yGe_{2-y}S_{8+n}Cl_{0.5}I_{0.5}$, $Li_{8.85}Sn_ySi_{2-y}S_{7.85+n}Cl_{0.7}I_{0.45}$, $Li_{7.5}As_ySn_{2-y}S_{7.5+n}I_{0.75}Br_{0.75}$, where y is in the range of $0.001\leq y\leq 1.999$ and n is >0, where n is >0.01, more preferably in the range of $0.01<n\leq 1$.

The present disclosure relates to the processing of sulfur-stuffed argyrodites with excess lithium sulfide.

A synthesis for sulfur-stuffed argyrodite may include, for example, a solid-state reaction, wherein excess lithium sulfide is added to a ceramic powder mixture prior to the synthesis to form sulfur-stuffed argyrodite.

A solid-state synthesis for sulfur-stuffed argyrodite may include, for example, high temperature annealing in a closed system, wherein high lithium sulfide vapor pressure drives or forces excess lithium sulfide into the argyrodite structure, forming sulfur-stuffed argyrodite.

Annealing temperature may be in the range of $100\leq T\leq 1000°$ C.

A solid-state synthesis for sulfur-stuffed argyrodite may have the parameters sufficient to integrate excess lithium sulfide into the argyrodite structure, forming the sulfur-stuffed argyrodite.

Any synthesis method not disclosed may use an excess amount of lithium sulfide to form sulfur-stuffed argyrodite, wherein the parameters of the synthesis method are sufficient to drive or force excess lithium sulfide into argyrodite structure, to form sulfur-stuffed argyrodite.

The present disclosure relates to the composition of sulfur-stuffed argyrodite with excess lithium sulfide.

Excess lithium sulfide may form superlattice stacking faults of one or more $Li_2S$ layers in the argyrodite structure, forming sulfur-stuffed argyrodite.

Sulfur-stuffed argyrodite, with excess lithium sulfide integrated into the argyrodite structure, may have the general formula:

$Li_{12-m-x+2n}M^{m+}Y_{(6-x)+n}X_x$, where $M^{m+}=B^{3+}$, $Ga^{3+}$, $Sb^{3+}$, $Si^{4+}$, $Ge^{4+}$, $Sn^{4+}$, $P^{5+}$, $As^{5+}$, or a combination thereof; $Y=S^{2-}$, and in some instances may also be in combination with $O^{2-}$, $Se^{2-}$, $Te^{2-}$, or a combination thereof; where $X^-=F^-$, $Cl^-$, $Br^-$, $I^-$, or a combination thereof; where x is in the range of $0\leq x\leq 2$; and where n is >0, preferably where n is >0.01, more preferably in the range of $0.3<n\leq 20$.

A sulfur-stuffed argyrodite, with excess lithium sulfide, may include, for example, an argyrodite composition with phosphorus and a single halogen with the formula:

$Li_{7-x+2n}PS_{(6-x)+n}X_x$; where X is a halogen element and x is in the range of 0≤x≤2. A formulation may include, for example, $Li_{6+2n}PS_{5+n}Cl$, $Li_{6.25+2n}PS_{5.25+n}Br_{0.75}$, $Li_{5.75+2n}PS_{4.75+n}I_{1.25}$, etc., where n is >0, preferably where n is >0.01, more preferably in the range of 0.3<n≤20.

A sulfur-stuffed argyrodite, with excess lithium sulfide, may include, for example, an argyrodite composition with phosphorous and more than one halogen with the formula:

$Li_{7-x'-x''+2n}PS_{(6-x'-x'')+n}X'_{x'}X''_{x''}$; where X' and X" are two different halogen elements and x'+x"≤2. A formulation may include, for example, $Li_{6+2n}PS_{5+n}Cl_{0.5}Br_{0.5}$, $Li_{5.75+2n}PS_{4.75+n}Cl_{0.75}I_{0.5}$, $Li_{6.25+2n}PS_{5.25+n}I_{0.5}Br_{0.25}$, etc., where n is >0, preferably where n is >0.01, more preferably in the range of 0.3<n≤20.

A sulfur-stuffed argyrodite, with excess lithium sulfide, may include, for example, an argyrodite composition with a phosphorus mixture and a single halogen with the formula:

$Li_{12-((5+m)/2)-x+2n}M_y^{m+}P_{1-y}S_{(6-x)+n}X_x$; where $M^{m+}$ is a positively charged ion other than phosphorous, X is a halogen element and x is in the range of 0>x>2. A formulation may include, for example, $Li_{7+2n}Sb_yP_{1-y}S_{5+n}Cl$, $Li_{6.5+2n}Si_yP_{1-y}S_{5+n}Br^-$, $Li_{6+2n}Sn_yPS_{4.5+n}Cl_{1.5}$, $Li_{6+2n}As_yS_{5+n}I$, etc., where y is in the range of 0.001≤y≤0.999 and n is >0, preferably where n is >0.01, more preferably in the range of 0.3<n≤20.

A sulfur-stuffed argyrodite, with excess lithium sulfide, may include, for example, an argyrodite composition with a phosphorous mixture and more than one halogen with the formula:

$Li_{12-(5+m)-x'-x''+2n}M_y^{m+}P_{1-y}S_{(6-x'-x'')+n}X'_{x'}X''_{x''}$; where X' and X" are two different halogens and x'+x"≤2. A formulation may include, for example, $Li_{7+2n}B_yP_{1-y}S_{5+n}Cl_{0.5}Br_{0.5}$, $Li_{6.75+2n}Sb_yP_{1-y}S_{4.75+n}Cl_{0.5}I_{0.75}$, $Li_{6+2n}Si_yP_{1-y}S_{4.5+n}Cl_{0.75}Br_{0.75}$, $Li_{6.5+2n}Sn_yP_{1-y}S_{5+n}Br_{0.5}I_{0.5}$, etc., where y is in the range of 0.001≤y≤0.999 and n is >0, preferably where n is >0.01, more preferably in the range of 0.3<n≤20.

A sulfur-stuffed argyrodite, with excess lithium sulfide, may include, for example, a single non-phosphorus argyrodite composition with a single halogen with the formula:

$Li_{12-m-x+2n}M^{m+S}{}_{(6-x)+n}X_x$; where $M^{m+}$ is a positively charged ion other than phosphorous, X is a halogen element and x is in the range of 0≤x≤2. A formulation may include, for example, $Li_{8+2n}BS_{5+n}Cl$, $Li_{7.5+2n}SbS_{4.5+n}Br_{1.5}$, $Li_{7+2n}SiS_{5+n}I$, $Li_{7.25+2n}SnS_{5.25+n}Cl_{0.75}$, $Li_{5.75+2n}AsS_{4.75+n}Br_{1.25}$, etc., where n is >0, preferably where n is >0.01, more preferably in the range of 0.3<n≤20.

A sulfur-stuffed argyrodite, with excess lithium sulfide, may include, for example, a single non-phosphorous argyrodite composition with more than one halogen with the formula:

$Li_{12-m-x'-x''+2n}M^{m+}S_{(6-x'-x'')+n}X'_{x'}X''_{x''}$; where $M^{m+}$ is a positively charged ion other than phosphorous, X' and X" are two different halogens elements and x'+x"<2. A formulation may include, for example, $Li_{8+2n}SbS_{5+n}Cl_{0.5}Br_{0.5}$, $Li_{6.75+2n}SiS_{4.75+n}Cl_{0.75}Br_{0.5}$, $Li_{7+2n}SnS_{5+n}Cl_{0.5}Br0.5$, $Li_{5.5+2n}AsS_{4.5+n}Br0.75I_{0.75}$, etc., where n is >0, preferably where n is >0.01, more preferably in the range of 0.3<n≤20.

A sulfur-stuffed argyrodite, with excess lithium sulfide, may include, for example, an argyrodite composition with a non-phosphorous mixture and a single halogen with the formula:

$Li_{12-((m'+m'')/2)-x+2n}M_y^{m'}M_{1-y}^{m''}S_{(6-x)-+n}X_x$; where $M^{m'}$ and $M^{m''}$ are two different positively charged ions other than phosphorous, X is a halogen element and x is in the range of 0≤x≤2. A formulation may include, for example, $Li_{8+2n}B_ySb_{1-y}S_{5+n}Cl$, $Li_{7.2+2n}Sb_{1-y}S_{4.7+n}Br_{1.3}$, $Li_{7.25+2n}Si_ySn_{1-y}S_{5.25+n}I_{0.75}$, $Li_{6.5+2n}B_yAs_{1-y}S_{4.5+n}Cl_{1.5}$, $Li_{6.25+2n}Si_yAs_{1-y}S_{4.75+n}Br_{1.25}$, etc. where y is in the range of 0.001≤y≤0.999 and n is >0, preferably where n is >0.01, more preferably in the range of 0.3<n≤20.

A sulfur-stuffed argyrodite, with excess lithium sulfide, may include, for example, an argyrodite composition with a non-phosphorous mixture and more than one halogen with the formula:

$Li_{12-((m'+m'')/2)-x'-x''+2n}M_y^{m'}M_{1-y}^{m''}S_{(6-x'-x'')+n}X'_{x'}X''_{x''}$, where $M^{m'}$ and $M^{m''}$ are two different positively charged ions other than phosphorous, X' and X" are two different halogens elements and x'+x"≤2. A formulation may include, for example, $Li_{8+2n}Ga_ySb_{1-y}S_{5+n}Cl_{0.5}Br_{0.5}$, $Li_{7.25+2n}Sb_ySi_{1-y}S_{4.75+n}Cl_{0.75}Br_{0.5}$, $Li_{7+2n}Si_yGe_{1-y}S_{5+n}Cl_{0.5}I_{b\ 0.5}$, $Li_{6.85+2n}Sn_ySi_{1-y}S_{4.85+n}Cl_{0.7}I_{0.45}$, $Li_{6+2n}As_ySn_{1-y}S_{4.5+n}I_{0.75}Br_{0.75}$, where y is in the range of 0.001≤y≤0.999 and n is >0, preferably where n is >0.01, more preferably in the range of 0.3<n≤20.

Sulfur-stuffed argyrodite, with excess lithium sulfide integrated into the argyrodite structure, may have the general formula:

$Li_{18-2m-x+2n}M_2^{m+}Y_{(9-x)+n}X_x$, where $M^{m+}=B^{3+}$, $Ga^{3+}$, $Sb^{3+}$, $Si^{4+}$, $Ge^{4+}$, $Sn^{4+}$, $P^{5+}$, As5+, or a combination thereof; where $Y=S^{2-}$, and in some instances may also be in combination with $O^{2-}$, $S^{2-}$, $Te^{2-}$, or a combination thereof; where $X^-=F^-$, $Cl^-$, $Br^-$, $I^-$, or a combination thereof; where x is in the range of 0≤x≤2; and where n is >0, preferably where n is >0.01, more preferably in the range of 0.3<n≤20.

A sulfur-stuffed argyrodite, with excess lithium sulfide, may include, for example, an argyrodite composition with phosphorus and a single halogen with the formula:

$Li_{9-x+2n}P_2S_{(9-x)+n}X_x$; where X is a halogen element and x is in the range of 0≤x≤2. A formulation may include, for example, $Li_{7+2n}P_2S_{8+n}Cl$, $Li_{7.25+2n}P_2S_{8.25+n}Br_{0.75}$, $Li_{6.75+2n}P_2S_{7.75+n}I_{1.25}$, etc., where n is >0, preferably where n is >0.01, more preferably in the range of 0.3<n≤20.

A sulfur-stuffed argyrodite, with excess lithium sulfide, may include, for example, an argyrodite composition with phosphorous and more than one halogen with the formula:

$Li_{8-x'-x''+2n}P_2S_{(9-x'-x'')+n}X'_{x'}X''_{x''}$, where X' and X" are two different halogen elements and x'+x"≤2. A formulation may include, for example, $Li_{7+2n}P_2S_{8+n}Cl_{0.5}Br_{0.5}$, $Li_{6.75+2n}P_2S_{7.75+n}Cl_{0.75}I_{0.5}$, $Li_{7.25+2n}P_2S_{8.25+n}Cl_{0.5}Br_{0.25}$, etc., where n is >0, preferably where n is >0.01, more preferably in the range of 0.3<n≤20.

A sulfur-stuffed argyrodite, with excess lithium sulfide, may include, for example, an argyrodite composition with a phosphorus mixture and a single halogen with the formula:

$Li_{18-(5+m)-x+2n}M_y^{m+}P_{2-y}S_{(9-x)+n}X_x$; where $M^{m+}$ is a positively charged ion other than phosphorous, X is a halogen element and x is in the range of 0≤x≤2. A formulation may include, for example, $Li_{9+2n}Sb_yP_{2-y}S_{8+n}Cl$, $Li_{8+2n}Si_yP_{2-y}S_{8+n}Br$, $Li_{7.5+2n}Sn_yP_{2-y}S_{7.5+n}Cl_{1.5}$, $Li_{7+2n}As_yP_{2-y}S_{8+n}$, etc., where y is in the range of 0.001<y<1.999; and n is >0, preferably where n is >0.01, more preferably in the range of 0.3<n≤20.

A sulfur-stuffed argyrodite, with excess lithium sulfide, may include, for example, an argyrodite composition with a phosphorous mixture and more than one halogen with the formula:

$Li_{18-(5+m)-x'-x''+2n}M_y^{m+}P_{2-y}S_{(9-x'-x'')+n}X'_{x'}X''_{x''}$; where X' and X" are two different halogens and x'+x"≤2. A formulation may include, for example, $Li_{9+2n}B_yP_{2-y}S_{8+n}Cl_{0.5}Br_{0.5}$, $Li_{8.75+2n}Sb_yP_{2-y}S_{7.75+n}Cl_{0.5}I_{0.75}$, $Li_{7.5+2n}Si_yP_{2-y}S_{3.5+n}Cl_{0.75}Br0.75$, $Li_{8+2n}Sn_yP_{2-y}S_{8+n}Br0.5I_{0.5}$, etc., where y is in the range of 0.001≤y≤1.999 and n is >0, preferably where n is >0.01, more preferably in the range of 0.3<n≤20.

A sulfur-stuffed argyrodite, with excess lithium sulfide, may include, for example, a single non-phosphorus argyrodite composition with a single halogen with the formula:

$Li_{18-2m-x+2n}M_2^{m+S}{}_{(9-x)+n}X_x$; where M' is a positively charged ion other than phosphorous, X is a halogen element and x is in the range of 0≤x≤2. A formulation may include, for example, $Li_{11+2n}B_2S_{8+n}Cl$, $Li_{10.5+2n}Sb_2S_{7.5+n}Br_{1.5}$, $Li_{9+2n}Si_2S_{8+n}I$, $Li_{9.25+2n}Sn_2S_{8.25+n}Cl_{0.75}$, $Li_{6.75+2n}As_2S_{7.75+n}Br_{1.25}$, etc., where n is >0, preferably where n is >0.01, more preferably in the range of 0.3<n≤20.

A sulfur-stuffed argyrodite, with excess lithium sulfide, may include, for example, a single non-phosphorous argyrodite composition with more than one halogen with the formula:

$Li_{18-2m-x'-x''+2n}M_2^{m+}S_{(9-x'-x'')+n}X'_{x'}X''_{x''}$; where M' is a positively charged ion other than phosphorous, X' and X" are two different halogens elements and x'+x"≤2. A formulation may include, for example, $Li_{11+2n}Sb_2S_{8+n}Cl_{0.5}Br_{0.5}$, $Li_{8.75+2n}Si_2S_{7.75+n}Cl_{0.75}Br_{0.5}$, $Li_{9+2n}S_yP_{2-y}S_{8+n}Cl_{0.5}Br_{0.5}$, $Li_{6.5+2n}As_2S_{7.5+n}Br_{0.75}I_{0.75}$, etc., where n is >0, preferably where n is >0.01, more preferably in the range of 0.3<n≤20.

A sulfur-stuffed argyrodite, with excess lithium sulfide, may include, for example, an argyrodite composition with a non-phosphorous mixture and a single halogen with the formula:

$Li_{18-(m'+m'')-x+2n}M_y^{m'}M_{2-y}^{m''}S_{(9-x)+n}X_x$; where $M^{m'}$ and $M^{u''}$ are two different positively charged ions other than phosphorous, X is a halogen element and x is in the range of 0≤x≤2. A formulation may include, for example, $Li_{11+2n}B_ySb_{2-y}S_{8+n}Cl$, $Li_{9.7+2n}Sb_ySi_{2-y}S_{7.7+n}Br_{1.3}$, $Li_{9.25+2n}Si_ySn_{2-y}S_{8.25+n}I_{0.75}$, $Li_{8.5+2n}B_yAs_{2-y}S_{7.5+n}Cl_{1.5}$, $Li_{7.75+2n}Si_yAs_{2-y}S_{7.75+n}Br_{1.25}$, etc. where y is in the range of 0.001≤y≤1.999 and n is >0, preferably where n is >0.01, more preferably in the range of 0.3<n≤20.

A sulfur-stuffed argyrodite, with excess lithium sulfide, may include, for example, an argyrodite composition with a non-phosphorous mixture and more than one halogen with the formula:

$Li_{18-(m'+m'')-x'-x''+2n}M_y^{m'}M_{2-y}^{m''}S_{(9-x'-x'')+n}X'_{x'}X''_{x''}$; where $M^{m'}$ and $M^{m''}$ are two different positively charged ions other than phosphorous, X' and X" are two different halogens elements and x'+x"≤2. A formulation may include, for example, $Li_{11+2n}Ga_ySb_{2-y}S_{8+n}Cl_{0.5}Br_{0.5}$, $Li_{9.75+2n}Sb_ySi_{2-y}S_{7.75+n}Cl_{0.75}Br_{0.5}$, $Li_{9+2n}Si_yGe_{2-y}S_{8+n}Cl_{0.5}I_{0.5}$, $Li_{8.85+2n}Sn_ySi_{2-y}S_{7.85+n}Cl_{0.7}I_{0.45}$, $Li_{7.5+2n}As_ySn_{2-y}S_{7.5+n}I_{0.75}Br_{0.75}$, where y is in the range of 0.001≤y≤1.999 and n is >0, preferably where n is >0.01, more preferably in the range of 0.3<n≤20.

The present disclosure relates to the features of sulfur-stuffed argyrodite.

A non-sulfur-stuffed or a nominal stoichiometric argyrodite formulation may be defined as the argyrodite formulation without excess sulfur or lithium sulfide.

Excess sulfur may be used to fill sulfur vacancies in argyrodite, wherein the sulfur-stuffed argyrodite has a lower number of sulfur vacancies than a non-sulfur-stuffed or a nominal stoichiometric argyrodite formulation.

Excess sulfur may be used to form sulfur interstitials in argyrodite, wherein the sulfur-stuffed argyrodite has more sulfur interstitials than a non-sulfur-stuffed or a nominal stoichiometric argyrodite formulation.

Excess sulfur may be used to form superlattice stacking faults, wherein the superlattice stacking faults are formed by a mixture of regular sulfur-lithium lattices and sulfur-lithium vacancy pairs, wherein the sulfur-stuffed argyrodite has more sulfur-lithium lattices and sulfur-lithium vacancy pairs than a non-sulfur-stuffed or nominal stoichiometric argyrodite formulation.

Excess lithium sulfide may be used to form superlattice stacking faults of one or more $Li_2S$ layers, wherein the sulfur-stuff argyrodite has more $Li_2S$ layers, in the form of superlattice stacking faults, than a non-sulfur-stuffed or nominal stoichiometric argyrodite formulation.

Excess sulfur or lithium sulfide may be used to reduce the electronic conductivity of argyrodite, wherein the sulfur-stuffed argyrodite has a lower electronic conductivity than a non-sulfur-stuffed or nominal stoichiometric argyrodite formulation.

Excess sulfur or lithium sulfide may be used to increase the ionic conductivity of argyrodite, wherein the sulfur-stuffed argyrodite has a higher ionic conductivity than a non-sulfur-stuffed or nominal stoichiometric argyrodite formulation.

Excess sulfur or lithium sulfide may be used to block lithium dendrite propagation in secondary batteries, wherein the secondary batteries that use sulfur-stuffed argyrodite as the solid-state electrolyte have a higher cycle life than those that use a non-sulfur-stuffed or nominal stoichiometric argyrodite formulation.

Excess sulfur or lithium sulfide may be used to increase the critical current density of argyrodite materials, wherein the sulfur-stuffed argyrodite has a higher critical current density than a non-sulfur-stuffed or nominal stoichiometric argyrodite formulation.

Excess sulfur or lithium sulfide may be used to increase the power rate of secondary batteries, wherein the secondary batteries that use sulfur-stuffed argyrodite as the solid-state electrolyte have a higher power rate than those that use a non-sulfur-stuffed or nominal stoichiometric argyrodite formulation.

Excess sulfur or lithium sulfide may be used to expand the electrochemical window of secondary batteries, wherein the secondary batteries that use sulfur-stuffed argyrodite as the solid-state electrolyte have a wider electrochemical window than those that use a non-sulfur-stuffed or nominal stoichiometric argyrodite formulation.

Secondary batteries may include, for example, solid-state batteries, hybrid solid-state batteries, semi-hybrid solid-state batteries, lithium metal batteries, hybrid lithium metal batteries, semi-hybrid lithium metal batteries, anodeless batteries, anodeless lithium metal batteries, hybrid anodeless lithium metal batteries, semi-hybrid anodeless lithium metal batteries, lithium air batteries, lithium primary batteries, microbatteries, thin film batteries, lithium sulfur batteries, etc.

Excess sulfur or lithium sulfide may be used to expand the electrochemical window of argyrodite, making sulfur-stuffed argyrodite chemically compatible with cathode materials.

A cathode material may include, for example, layered $YMO_2$, Y-rich layered $Y_{1+x}M_{1-x}O_2$, spinel $YM_2O_4$, olivine $YMPO_4$, silicate $Y_2MSiO_4$, borate $YMBO_3$, tavorite $YMPO_4F$ (where M is Fe, Co, Ni, Mn, Cu, Cr, etc.), (where Y is Li, Na, K, Mg, Zn, Al, etc.), vanadium oxides, sulfur, lithium sulfide, $FeF_3$, LiSe.

In the case of lithium intercalation, a cathode material may include, for example, lithium iron phosphate ($LiFePO_4$), lithium cobalt oxide ($LiCoO_2$), lithium manganese oxide ($LiMn_2O_4$), and lithium nickel oxide ($LiNiO_2$), lithium nickel cobalt manganese oxide ($LiNi_xCo_yMn_zO_2$, 0.95≥≥0.5, 0.3≥y≥0.025, 0.2≥z≥0.025), lithium nickel cobalt aluminum oxide ($LiNi_xCo_yAl_zO_2$, 0.95≥x≥0.5, 0.3≥y≥0.025, 0.2≥z≥0.025), lithium nickel manganese spinel ($LiNi_{0.5}Mn_{1.5}O_4$), etc.

A cathode may be coated with a protective layer to prevent reactions between the sulfur-stuffed argyrodite, wherein high voltage is needed but the electrochemical window is not sufficiently expanded. Protective layers may be composed of, for example, lithium borate, lithium aluminate ($LiAlO_2$), lithium tungstate ($Li_2WO_4$), lithium niobium oxide ($LiNbO_3$), lithium phosphate ($Li_3PO_4$). lithium oxysulfide (LiAlSO, $Li_3PO_4$—$Li_2S$—$SiS_2$), lithium oxynitride (LiPON), etc.

Sulfur-stuffed argyrodite may be used in the cathode, in the form of a catholyte, forming a composite cathode. The sulfur-stuffed argyrodite may in mixed into a composite or milled with an active cathode material to form a core-shell structure, wherein the sulfur-stuffed argyrodite makes up most, if not all, of the shell.

Sulfur-stuffed argyrodite may be used as a cathode in lithium sulfur batteries, wherein the excess sulfur or lithium sulfide may serve as the active cathode material in the lithium sulfur battery, wherein the rest of the argyrodite structure serves as a catholyte, wherein the sulfur-stuffed argyrodite enable lean electrolytes.

Excess sulfur or lithium sulfide may be used to improve chemical compatibility with a lithium metal or lithium metal alloy anodes, wherein the sulfur-stuffed argyrodite is more chemically stable with lithium metal or lithium metal alloy anodes than a non-sulfur-stuffed or nominal stoichiometric argyrodite formulation. Alloy metals may include, for example, indium, zinc, magnesium, manganese, etc.

Excess sulfur or lithium sulfide may be used to improve chemical compatibility with current collectors such a copper, wherein the sulfur-stuffed argyrodite is more chemically stable with current collectors than a non-sulfur-stuffed or nominal stoichiometric argyrodite formulation.

Excess sulfur or lithium sulfide may be used to improve chemical compatibility with carbon or electronically conductive additives such as carbon black, wherein the sulfur-stuffed argyrodite is more chemically stability with electronically conductive additives than a non-sulfur-stuffed or nominal stoichiometric argyrodite formulation.

Excess sulfur or lithium sulfide may be used to improve chemical compatibility with anode materials such as graphite or silicon, wherein the sulfur-stuffed argyrodite is more chemically stable with anode materials than a non-sulfur-stuffed or nominal stoichiometric argyrodite formulation.

Excess sulfur or lithium sulfide may be used to improve chemical compatibility with liquid electrolytes such as carbonated-based organic liquid electrolytes or room temperature ionic liquid electrolytes, wherein the sulfur-stuff argyrodite is more chemically stable with liquid electrolytes than a non-sulfur-stuffed or nominal stoichiometric argyrodite formulation.

Excess sulfur or lithium sulfide may be used to improve chemical compatibility with heatable materials embedded in the solid-state electrolyte, wherein the sulfur-stuffed argyrodite is more chemically stable with embedded heatable materials than a non-sulfur-stuffed or nominal stoichiometric argyrodite formulation. Embedded materials may be heated using a resistive, induction, or dielectric heating method.

Excess sulfur or lithium sulfide may be used to improve chemical compatibility with electronically insulative coatings on heatable materials embedded in the solid-state electrolyte, wherein the sulfur-stuffed argyrodite is more chemically stable with insulative coatings than a non-sulfur-stuffed or nominal stoichiometric argyrodite formulation. Embedded materials may be heated using a resistive, induction, or dielectric heating method.

Sulfur-stuff argyrodite may be used in the anode, in the form of an anolyte, forming a composite anode.

The figures of the present disclosure further describe sulfur-stuffed argyrodite materials.

FIG. 1: X-ray diffraction patterns for a) sulfur-stuffed argyrodite and b) a non-sulfur-stuffed or nominal stoichiometric argyrodite formulation. The sulfur-stuffed argyrodite pattern shows a single lithium sulfide peak at 27° corresponding to the (111)-lithium sulfide peak. The single peak further indicates the integration of lithium sulfide in the form of superlattice stacking faults as opposed to excess precursor wherein one you would expect multiple lithium sulfide peaks to be present. The lithium sulfide peak intensity may be greater than 3% of the peak intensities for the sulfide-based ionic-conductive argyrodite structure. Alternatively, such structures can be observed using transmission electron microscopy (TEM) or high resolution transmission electron microscopy (HRTEM).

FIG. 2: A Hebb-Wagner polarization curve at a constant voltage of 0.3V demonstrating a one order of magnitude reduction in electronic conductivity for a sulfur-stuffed argyrodite (bottom) formulation over that of nominal stoichiometric (standard) argyrodite formulation (top). Evaluation was done at room temperature under 330 MPa of pressure in a PEEK-type split-cell (1.13 $cm^2$) using 250 mg of solid-state electrolyte material (0.1 mm in thickness). Electronic conductivity values of $3.8\times10^{-8}$ and $4.4\times10^{-7}$ S/cm were recorded for the sulfur-stuffed argyrodite and standard or nominal stoichiometric argyrodite formulations, respectively.

The above-described systems and methods can be ascribed to terminologies other than sulfur-stuffed argyrodite such as, for example, sulfur-enriched argyrodite, sulfur-abundant argyrodite, sulfur-sufficient argyrodite, sulfur-packed argyrodite, sulfur-filled argyrodite, sulfur-enhanced argyrodite, etc.

The above-described systems and methods can be ascribed to an argyrodite material with a chalcogen element other than sulfur, such as, for example, oxygen, selenium, tellurium, or a combination thereof. Such materials may be referred to as, for example, oxygen-stuffed argyrodite, selenium-stuffed argyrodite, or tellurium-stuffed argyrodite.

The above-described systems and methods can be ascribed to sulfide-based solid-state electrolyte materials that do not have an argyrodite structure but still have a relatively high room temperature ionic conductivity ($\geq10^{-5}$ S $cm^{-1}$) and contain the elements lithium, sulfur, chalcogenide-based or sulfide-based ionic-conductive structure may have an argyrodite structure or non-argyrodite structure. The chalcogenide-based or sulfide-based ionic-conductive non-argyrodite structures should have a relatively high room temperature ionic conductivity (e.g., $\geq10^{-5}$ S $cm^{-1}$) and preferably contain the elements lithium, sulfur, and phosphorous (or a mixture of phosphorous with a non-phosphorus element), An example includes Thio-LISCON $Li_{10}GeP_2S_{12+n}$, where n corresponds to excess sulfur, where n>0, preferably where n>0.01, more preferably in the range of 0.01<n<1. Another example includes Thio-LISCON $Li_{10+2n}GeP_2S_{12+n}$, where n corresponds to excess lithium sulfide, where n>0, preferably where n>0.01, more preferably in the range of 0.3<n<20. Additionally, or alternatively, the chalcogenide-based or sulfide-based ionic-conductivity non-argyrodite contain the elements lithium, sulfur, phosphorous (or a mixture of phosphorous with a non-phosphorus element), and one or more halogens. An example includes $Li_{9.54}Si_{1.74}P_{1.44}S_{11.7+n}Cl_{0.3}$, where n corresponds to excess sulfur, where n>0, preferably where n>0.01, more preferably in the range of 0.01<n<1. Another example includes $Li_{9.54+2n}Si_{1.74}P_{1.44}S_{11.7+n}Cl_{0.3}$, where n correspond corresponds to excess lithium sulfide, where n>0, preferably where n>0.01, more preferably in the range of 0.3<n<20. Other formulas will become apparent to those skilled in the art.

The above-described systems and methods can be ascribed to argyrodite formulations such as, for example, $Li_{24-3m-x}(M_3{}^{m+}Y_{10}{}^{2-})Y_{2-x}{}^{2-}X_x$, where $M^{m+}=B^{3+}$, $Ga^{3+}$, $Sb^{3+}$, $Si^{4+}$, $Ge^{4+}$, $Sn^{4+}$, $P^{5+}$, $As^{5+}$, or a combination thereof; where $Y=S^{2-}$, and in some instances may also be in combination with $O^{2-}$, $S^{2-}$, $Te^{2-}$, or a combination thereof; where $X^-=F^-$, $Cl^-$, $Br^-$, $I^-$, or a combination thereof; where x is in the range of 0–x≤2. Furthermore, formulations of $Li_{24-3m-x}M_3{}^{m+}S_{(12-x)+n}X_x$ and $Li_{24-3m-x+2n}M_3m+S_{(12-x)+n}X_x$, may correspond to excess sulfur and excess lithium sulfide, respectively, where n>0, preferably where n>0.01. Examples may include $Li_8P_3S_{11+n}Cl$ and $Li_{8+2n}P_3S_{11+n}Cl$ for excess sulfur and excess lithium sulfide, respectively. Other argyrodite formulas will become apparent to those skilled in the art.

The above-described systems and methods can be ascribed to sulfur-stuffed argyrodite materials with chemistries other than lithium ion, which may include, for example, sodium ion, aluminum ion, magnesium ion, iron ion, potassium ion, etc.

The above-described systems and methods can be ascribed to sulfur-stuffed argyrodite powders, or other forms, for commercial availability.

The above-described system methods can be ascribed to sulfur-stuffed argyrodite in the form of, for example, powder, nanopowder, micropowder, composite, pellets, disk, plates, membranes, thin films, etc.

The above-described system and methods can be ascribed to ceramic-polymer composite solid-state electrolyte membranes, wherein the sulfur-stuff argyrodite is the ceramic material, wherein the ceramic loading has a weight percentage in the range of 0.1<p<99.99%. A ceramic-polymer composite solid-state electrolyte may be supported onto a fabric support.

The above-described systems and methods can be ascribed to solid-state electrolyte membranes composed of sulfur-stuffed argyrodite, wherein the membrane is formed using high-throughput processing techniques such as, for example, cold spray, supersonic particle deposition, thermal spray, flame spray, plasma spray, etc. Membranes may be formed onto current collectors, anodes, composite anodes, lithium or lithium metal alloy anodes, cathodes, composite cathodes, etc. Processing may be done in the atmosphere, under vacuum, or in an inert environment.

The above-described systems and methods can be ascribed to solid-state electrolyte membranes composed of sulfur-stuffed argyrodite, wherein the membrane is formed using physical high-vacuum processing methods such as, for example, pulsed laser deposition, sputtering, etc. Membranes may be formed onto current collectors, anodes, composite anodes, lithium or lithium metal alloy anodes, cathodes, composite cathodes, etc.

The above-describes system and methods can be ascribed to secondary batteries including, for example, solid-state batteries, hybrid solid-state batteries, semi-hybrid solid-state batteries, lithium metal batteries, hybrid lithium metal batteries, semi-hybrid lithium metal batteries, anodeless batteries, anodeless lithium metal batteries, hybrid anodeless lithium metal batteries, semi-hybrid anodeless lithium metal batteries, lithium air batteries, lithium primary batteries, microbatteries, thin film batteries, lithium sulfur batteries, etc.

The above-described systems and methods can be ascribed to various secondary battery designs such as, for example, pouch cell, coil cell, button cell, cylindrical cell, prismatic cell, etc.

The above-described systems and methods can be ascribed to secondary batteries with the end use applications such as, for example, electric vehicles, hybrid electric vehicles, mobile devices, handheld electronics, consumer electronics, medical, medical wearables, and wearables for portable energy storage.

The above-described systems and methods can be ascribed to secondary batteries for grid scale energy storage backup systems.

The above-described systems and methods can be used in locations other than the vicinity of earth including in space, such as space stations, satellites, both natural and unnatural, and other planetary bodies such as mars.

The above-described systems and methods can be ascribed to secondary batteries for longevity, higher energy density and power density and improved safety.

The above-described systems and methods can be ascribed to redox flow or flow batteries as separation membrane between anolyte and catholyte.

The above-described systems and methods can be ascribed to non-battery application such us upstream lithium mining or downstream spent battery recycling, wherein sulfur-stuffed argyrodite is in the form of a dense membrane used to extract lithium from a lithium containing solution such as brine or spent battery waste.

The above-described systems and methods can be ascribed to the formation of sulfur-stuffed argyrodite onto a porous substrate such as, for example, aluminum foam or nickel mesh for either battery or non-battery applications.

The following clauses are included to emphasis certain combinations of features of the present description. The invention of the present description is not limited thereof 1. A solid-state electrolyte material, comprising: a chalcogenide-based ionic-conductive structure comprising: one or more of lithium, sodium, aluminum, magnesium, iron, and potassium; one or more of sulfur, oxygen, selenium, and tellurium; one or more of boron, gallium, antimony, silicon, germanium, tin, phosphorus, and arsenic; and at least one of excess chalcogen and excess chalcogenide incorporated into the chalcogenide-based ionic-conductive structure.

2. The solid-state electrolyte material of clause 1, wherein the excess chalcogen is disposed within vacancies of the chalcogenide-based ionic-conductive structure.

3. The solid-state electrolyte material of any one of clauses 1 to 2, wherein the excess chalcogen is disposed within interstitials of the chalcogenide-based ionic-conductive structure.

4. The solid-state electrolyte material of any one of clauses 1 to 3, wherein the excess chalcogen is present in form of superlattice stacking faults within the chalcogenide-based ionic-conductive structure.

5. The solid-state electrolyte material of any one of clauses 1 to 4, wherein the excess chalcogenide is present in form of a chalcogenide layer within the chalcogenide-based ionic-conductive structure.

6. The solid-state electrolyte material of any one of clauses 1 to 5, wherein the excess chalcogenide is present in form of superlattice stacking faults of multiple chalcogenide layers within the chalcogenide-based ionic-conductive structure.

7. The solid-state electrolyte material of any one of clauses 1 to 6, wherein chalcogenide-based ionic-conductive structure has a visible (111) peak corresponding to the excess chalcogenide in an X-ray diffraction pattern. The excess chalcogenide peak intensity may be greater than 3% of the peak intensities for the sulfide-based ionic-conductive argyrodite structure.

8. The solid-state electrolyte material of any one of clauses 1 to 7, wherein an electronic conductivity of the chalcogenide-based ionic-conductive structure having the at least one of excess chalcogen and excess chalcogenide is less than an electronic conductivity of a nominal stoichiometric chalcogenide-based ionic-conductive structure not having the at least one of excess chalcogen and excess chalcogenide.

9. The solid-state electrolyte material of any one of clauses 1 to 8, wherein an electronic conductivity of the chalcogenide-based ionic-conductive structure having the at least one of excess chalcogen and excess chalcogenide is less than half of an electronic conductivity of a nominal stoichiometric chalcogenide-based ionic-conductive structure not having the at least one of excess chalcogen and excess chalcogenide.

10. The solid-state electrolyte material of any one of clauses 1 to 9, wherein an electronic conductivity of the chalcogenide-based ionic-conductive structure having the at least one of excess chalcogen and excess chalcogenide is less than a quarter of an electronic conductivity of a nominal stoichiometric chalcogenide-based ionic-conductive structure not having the at least one of excess chalcogen and excess chalcogenide.

11. The solid-state electrolyte material of any one of clauses 1 to 10, wherein an electronic conductivity of the chalcogenide-based ionic-conductive structure having the at least one of excess chalcogen and excess chalcogenide is approximately a tenth of an electronic conductivity of a nominal stoichiometric chalcogenide-based ionic-conductive structure not having the at least one of excess chalcogen and excess chalcogenide.

12. The solid-state electrolyte material of any one of clauses 1 to 11, wherein an electronic conductivity of the chalcogenide-based ionic-conductive structure is $<10^{-7}$ S/cm.

13. The solid-state electrolyte material of any one of clauses 1 to 12, wherein an electronic conductivity of the chalcogenide-based ionic-conductive structure is $<10^{-8}$ S/cm.

14. The solid-state electrolyte material of any one of clauses 1 to 13, wherein an electronic conductivity of the chalcogenide-based ionic-conductive structure is $<10^{-9}$ S/cm.

15. The solid-state electrolyte material of any one of clauses 1 to 14, wherein an electronic conductivity of the chalcogenide-based ionic-conductive structure is $<10^{-10}$ S/cm.

16. The solid-state electrolyte material of any one of clauses 1 to 15, wherein a critical current density of the chalcogenide-based ionic-conductive structure having the at least one of excess chalcogen and excess chalcogenide is greater than a critical current density of a nominal stoichiometric chalcogenide-based ionic-conductive structure not having the at least one of excess chalcogen and excess chalcogenide.

17. The solid-state electrolyte material of any one of clauses 1 to 16, wherein a critical current density of the chalcogenide-based ionic-conductive structure having the at least one of excess chalcogen and excess chalcogenide is at least 10% greater than a critical current density of a nominal stoichiometric chalcogenide-based ionic-conductive structure not having the at least one of excess chalcogen and excess chalcogenide.

18. The solid-state electrolyte material of any one of clauses 1 to 17, wherein a critical current density of the chalcogenide-based ionic-conductive structure having the at least one of excess chalcogen and excess chalcogenide is at least 20% greater than a critical current density of a nominal stoichiometric chalcogenide-based ionic-conductive structure not having the at least one of excess chalcogen and excess chalcogenide.

19. The solid-state electrolyte material of any one of clauses 1 to 18, wherein a critical current density of the chalcogenide-based ionic-conductive structure having the at least one of excess chalcogen and excess chalcogenide is at least 30% greater than a critical current density of a nominal stoichiometric chalcogenide-based ionic-conductive structure not having the at least one of excess chalcogen and excess chalcogenide.

20. The solid-state electrolyte material of any one of clauses 1 to 19, wherein a critical current density of the chalcogenide-based ionic-conductive structure having the at least one of excess chalcogen and excess chalcogenide is at least 40% greater than a critical current density of a nominal stoichiometric chalcogenide-based ionic-conductive structure not having the at least one of excess chalcogen and excess chalcogenide.

21.The solid-state electrolyte material of any one of clauses 1 to 20, wherein a critical current density of the chalcogenide-based ionic-conductive structure is greater than 0.2 $mA/cm^2$.

22. The solid-state electrolyte material of any one of clauses 1 to 21, wherein a critical current density of the chalcogenide-based ionic-conductive structure is greater than 0.4 $mA/cm^2$.

23. The solid-state electrolyte material of any one of clauses 1 to 22, wherein a critical current density of the chalcogenide-based ionic-conductive structure is greater than 0.6 $mA/cm^2$.

24. The solid-state electrolyte material of any one of clauses 1 to 23, wherein a critical current density of the chalcogenide-based ionic-conductive structure is greater than 0.8 $mA/cm^2$.

25. The solid-state electrolyte material of any one of clauses 1 to 24, wherein a critical current density of the chalcogenide-based ionic-conductive structure is greater than 1.0 $mA/cm^2$.

26. The solid-state electrolyte material of any one of clauses 1 to 25, wherein a critical current density of the chalcogenide-based ionic-conductive structure is greater than 2.0 $mA/cm^2$.

27. The solid-state electrolyte material of any one of clauses 1 to 26, wherein a critical current density of the chalcogenide-based ionic-conductive structure is greater than 3.0 $mA/cm^2$.

28. The solid-state electrolyte material of any one of clauses 1 to 27, wherein a critical current density of the chalcogenide-based ionic-conductive structure is greater than 4.0 $mA/cm^2$.

29. The solid-state electrolyte material of any one of clauses 1 to 28, wherein a critical current density of the chalcogenide-based ionic-conductive structure is greater than 5.0 $mA/cm^2$.

30. The solid-state electrolyte material of any one of clauses 1 to 29, wherein the chalcogenide-based ionic-conductive structure comprises lithium.

31. The solid-state electrolyte material of any one of clauses 1 to 30, wherein the chalcogenide-based ionic-conductive structure comprises sulfur.

32. The solid-state electrolyte material of any one of clauses 1 to 31, wherein the chalcogenide-based ionic-conductive structure comprises phosphorus.

33. The solid-state electrolyte material of any one of clauses 1 to 32, wherein the excess chalcogen comprises excess sulfur.

34. The solid-state electrolyte material of any one of clauses 1 to 33, wherein the excess chalcogenide comprises excess lithium sulfide.

35. The solid-state electrolyte material of any one of clauses 1 to 34, wherein the chalcogenide-based ionic-conductive structure has an argyrodite structure.

36. The solid-state electrolyte material of clause 35, wherein the argyrodite structure has more than one halogen.

37. A solid-state electrolyte material, comprising: a sulfide-based ionic-conductive structure comprising: lithium; sulfur and optionally in combination with oxygen, selenium, tellurium, or a combination thereof; one or more of boron, gallium, antimony, silicon, germanium, tin, phosphorus, and arsenic; and at least one of excess sulfur and excess lithium sulfide incorporated into the sulfide-based ionic-conductive structure.

38. The solid-state electrolyte material of clause 37, wherein the excess sulfur is disposed within vacancies of the sulfide-based ionic-conductive structure.

39. The solid-state electrolyte material of any one of clauses 37 to 38, wherein the excess sulfur is disposed within interstitials of the sulfide-based ionic-conductive structure.

40. The solid-state electrolyte material of any one of clauses 37 to 39, wherein the excess sulfur is present in form of superlattice stacking faults within the sulfide-based ionic-conductive structure.

41. The solid-state electrolyte material of any one of clauses 37 to 40, wherein the excess lithium sulfide is present in form of a lithium sulfide layer within the sulfide-based ionic-conductive structure.

42. The solid-state electrolyte material of any one of clauses 37 to 41, wherein the excess lithium sulfide is present in form of superlattice stacking faults of multiple lithium sulfide layers within the sulfide-based ionic-conductive structure.

43. The solid-state electrolyte material of any one of clauses 37 to 42, wherein sulfide-based ionic-conductive structure has a visible (111) peak corresponding to the excess chalcogenide in an X-ray diffraction pattern. The excess chalcogenide peak intensity may be greater than 3% of the peak intensities for the sulfide-based ionic-conductive argyrodite structure 44. The solid-state electrolyte material of any one of clauses 37 to 43, wherein an electronic conductivity of the sulfide-based ionic-conductive structure having the at least one of excess sulfur and excess lithium sulfide is less than an electronic conductivity of a nominal stoichiometric sulfide-based ionic-conductive structure not having the at least one of excess sulfur and excess lithium sulfide.

45. The solid-state electrolyte material of any one of clauses 37 to 44, wherein an electronic conductivity of the sulfide-based ionic-conductive structure having the at least one of excess sulfur and excess lithium sulfide is less than half of an electronic conductivity of a nominal stoichiometric sulfide-based ionic-conductive structure not having the at least one of excess sulfur and excess lithium sulfide.

46. The solid-state electrolyte material of any one of clauses 37 to 45, wherein an electronic conductivity of the sulfide-based ionic-conductive structure having the at least one of excess sulfur and excess lithium sulfide is less than a quarter of an electronic conductivity of a nominal stoichiometric sulfide-based ionic-conductive structure not having the at least one of excess sulfur and excess lithium sulfide.

47. The solid-state electrolyte material of any one of clauses 37 to 46, wherein an electronic conductivity of the sulfide-based ionic-conductive structure having the at least one of excess sulfur and excess lithium sulfide is approximately a tenth of an electronic conductivity of a nominal stoichiometric sulfide-based ionic-conductive structure not having the at least one of excess sulfur and excess lithium sulfide.

48. The solid-state electrolyte material of any one of clauses 37 to 47, wherein an electronic conductivity of the sulfide-based ionic-conductive structure is $<10^{-7}$ S/cm.

49. The solid-state electrolyte material of any one of clauses 37 to 48, wherein an electronic conductivity of the sulfide-based ionic-conductive structure is $<10^{-8}$ S/cm.

50. The solid-state electrolyte material of any one of clauses 37 to 49, wherein an electronic conductivity of the sulfide-based ionic-conductive structure is $<10^{-9}$ S/cm.

51. The solid-state electrolyte material of any one of clauses 37 to 50, wherein an electronic conductivity of the sulfide-based ionic-conductive structure is $<10^{-19}$ S/cm.

52. The solid-state electrolyte material of any one of clauses 37 to 51, wherein a critical current density of the sulfide-based ionic-conductive structure having the at least one of excess sulfur and excess lithium sulfide is greater than a critical current density of a nominal stoichiometric sulfide-based ionic-conductive structure not having the at least one of excess sulfur and excess lithium sulfide.

53. The solid-state electrolyte material of any one of clauses 37 to 52, wherein a critical current density of the sulfide-based ionic-conductive structure having the at least one of excess sulfur and excess lithium sulfide is at least 10% greater than a critical current density of a nominal stoichiometric sulfide-based ionic-conductive structure not having the at least one of excess sulfur and excess lithium sulfide.

54. The solid-state electrolyte material of any one of clauses 37 to 53, wherein a critical current density of the sulfide-based ionic-conductive structure having the at least one of excess sulfur and excess lithium sulfide is at least 20% greater than a critical current density of a nominal stoichiometric sulfide-based ionic-conductive structure not having the at least one of excess sulfur and excess lithium sulfide.

55. The solid-state electrolyte material of any one of clauses 37 to 54, wherein a critical current density of the sulfide-based ionic-conductive structure having the at least one of excess sulfur and excess lithium sulfide is at least 30% greater than a critical current density of a nominal stoichiometric sulfide-based ionic-conductive structure not having the at least one of excess sulfur and excess lithium sulfide.

56. The solid-state electrolyte material of any one of clauses 37 to 55, wherein a critical current density of the sulfide-based ionic-conductive structure having the at least one of excess sulfur and excess lithium sulfide is at least 40% greater than a critical current density of a nominal stoichiometric sulfide-based ionic-conductive structure not having the at least one of excess sulfur and excess lithium sulfide.

57. The solid-state electrolyte material of any one of clauses 37 to 56, wherein a critical current density of the sulfide-based ionic-conductive structure is greater than 0.2 $mA/cm^2$.

58. The solid-state electrolyte material of any one of clauses 37 to 57, wherein a critical current density of the sulfide-based ionic-conductive structure is greater than 0.4 $mA/cm^2$.

59. The solid-state electrolyte material of any one of clauses 37 to 58, wherein a critical current density of the sulfide-based ionic-conductive structure is greater than 0.6 $mA/cm^2$.

60. The solid-state electrolyte material of any one of clauses 37 to 59, wherein a critical current density of the sulfide-based ionic-conductive structure is greater than 0.8 $mA/cm^2$.

61. The solid-state electrolyte material of any one of clauses 37 to 60, wherein a critical current density of the sulfide-based ionic-conductive structure is greater than 1.0 $mA/cm^2$.

62. The solid-state electrolyte material of any one of clauses 37 to 61, wherein a critical current density of the sulfide-based ionic-conductive structure is greater than 2.0 $mA/cm^2$.

63. The solid-state electrolyte material of any one of clauses 37 to 62, wherein a critical current density of the sulfide-based ionic-conductive structure is greater than 3.0 $mA/cm^2$.

64. The solid-state electrolyte material of any one of clauses 37 to 63, wherein a critical current density of the sulfide-based ionic-conductive structure is greater than 4.0 $mA/cm^2$.

65. The solid-state electrolyte material of any one of clauses 37 to 64, wherein a critical current density of the sulfide-based ionic-conductive structure is greater than 5.0 $mA/cm^2$.

66. The solid-state electrolyte material of any one of clauses 37 to 65, wherein the sulfide-based ionic-conductive structure comprises phosphorus.

67. The solid-state electrolyte material of any one of clauses 37 to 66, wherein the sulfide-based ionic-conductive structure has an argyrodite structure.

68. The solid-state electrolyte material of clause 67, wherein the argyrodite structure has more than one halogen.

69. A solid-state electrolyte material, comprising: a sulfide-based ionic-conductive argyrodite structure comprising: lithium; sulfur and optionally in combination with oxygen, selenium, tellurium, or a combination thereof; one or more of boron, gallium, antimony, silicon, germanium, tin, phosphorus, and arsenic; one or more halogens; and excess sulfur incorporated into the sulfide-based ionic-conductive argyrodite structure.

70. The solid-state electrolyte material of clause 69, wherein the sulfide-based ionic-conductive argyrodite structure has the general formula: $Li_{12-m-x}M^{m+}Y$ where $M^{m+}=B^{3+}$, $Ga^{3+}$, $Sb^{3+}$, $Si^{4+}$, $Ge^{4+}$, $Sn^{4+}$, $P^{5+}$, $As^{5+}$, or a combination thereof; where $Y=S^{2-}$, and optionally in combination with $O^{2-}$, $S^{2-}$, $Te^{2-}$, or a combination thereof; where $X^-=F^-$, $Cl^-$, $Br^-$, $I^-$, or a combination thereof; where x is in the range of $0\leq x\leq 2$; and where n is >0.01.

71. The solid-state electrolyte material of clause 70, where n is in the range of $0.01<n\leq 1$.

72. The solid-state electrolyte material of clause 69, wherein the sulfide-based ionic-conductive argyrodite structure has the general formula: $Li_{18-2m-x}M_2^{m+}Y_{(9-x)+n}X_x$, where $M^{m+}=B^{3+}$, $Ga^{3+}$, $Sb^{3+}$, $Si^{4+}$, $Ge^{4+}$, $Sn^{4+}$, $P^{5+}$, $As^{5+}$, or a combination thereof; where $Y=S^{2-}$, and optionally in combination with $O^{2-}$, $S^{2-}$, $Te^{2-}$, or a combination thereof; where $X^-=F^-$, $Cl^-$, $Br^-$, $I^-$, or a combination thereof; where xis in the range of $0\leq x\leq 2$; and where n is >0.01.

73. The solid-state electrolyte material of clause 72, where n is in the range of $0.01<n\leq 1$.

74. The solid-state electrolyte material of any one of clauses 69 to 73, wherein the excess sulfur is disposed within vacancies of the sulfide-based ionic-conductive argyrodite structure.

75. The solid-state electrolyte material of any one of clauses 69 to 74, wherein the excess sulfur is disposed within interstitials of the sulfide-based ionic-conductive argyrodite structure.

76. The solid-state electrolyte material of any one of clauses 69 to 75, wherein the excess sulfur is present in form of superlattice stacking faults within the sulfide-based ionic-conductive argyrodite structure.

77. The solid-state electrolyte material of any one of clauses 69 to 76, wherein an electronic conductivity of the sulfide-based ionic-conductive argyrodite structure having the excess sulfur is less than an electronic conductivity of a nominal stoichiometric sulfide-based ionic-conductive argyrodite structure not having the excess sulfur.

78. The solid-state electrolyte material of any one of clauses 69 to 77, wherein an electronic conductivity of the sulfide-based ionic-conductive argyrodite structure having the excess sulfur is less than half of an electronic conductivity of a nominal stoichiometric sulfide-based ionic-conductive argyrodite structure not having the excess sulfur.

79. The solid-state electrolyte material of any one of clauses 69 to 78, wherein an electronic conductivity of the sulfide-based ionic-conductive argyrodite structure having the excess sulfur is less than a quarter of an electronic conductivity of a nominal stoichiometric sulfide-based ionic-conductive argyrodite structure not having the excess sulfur.

80. The solid-state electrolyte material of any one of clauses 69 to 79, wherein an electronic conductivity of the sulfide-based ionic-conductive argyrodite structure having the excess sulfur is approximately a tenth of an electronic conductivity of a nominal stoichiometric sulfide-based ionic-conductive argyrodite structure not having the excess sulfur.

81. The solid-state electrolyte material of any one of clauses 69 to 80, wherein an electronic conductivity of the sulfide-based ionic-conductive argyrodite structure is $<10^{-7}$ S/cm.

82. The solid-state electrolyte material of any one of clauses 69 to 81, wherein an electronic conductivity of the sulfide-based ionic-conductive argyrodite structure is $<10^{-8}$ S/cm.

83. The solid-state electrolyte material of any one of clauses 69 to 82, wherein an electronic conductivity of the sulfide-based ionic-conductive argyrodite structure is $<10^{-9}$ S/cm.

84. The solid-state electrolyte material of any one of clauses 69 to 83, wherein an electronic conductivity of the sulfide-based ionic-conductive argyrodite structure is $<10^{-19}$ S/cm.

85. The solid-state electrolyte material of any one of clauses 69 to 84, wherein a critical current density of the sulfide-based ionic-conductive argyrodite structure having the excess sulfur is greater than a critical current density of a nominal stoichiometric sulfide-based ionic-conductive argyrodite structure not having the excess sulfur.

86. The solid-state electrolyte material of any one of clauses 69 to 85, wherein a critical current density of the sulfide-based ionic-conductive argyrodite structure having the excess sulfur is at least 10% greater than a critical current density of a nominal stoichiometric sulfide-based ionic-conductive argyrodite structure not having the excess sulfur.

87. The solid-state electrolyte material of any one of clauses 69 to 86, wherein a critical current density of the sulfide-based ionic-conductive argyrodite structure having the excess sulfur is at least 20% greater than a critical current density of a nominal stoichiometric sulfide-based ionic-conductive argyrodite structure not having the excess sulfur.

88. The solid-state electrolyte material of any one of clauses 69 to 87, wherein a critical current density of the sulfide-based ionic-conductive argyrodite structure having the excess sulfur is at least 30% greater than a critical current density of a nominal stoichiometric sulfide-based ionic-conductive argyrodite structure not having the excess sulfur.

89. The solid-state electrolyte material of any one of clauses 69 to 88, wherein a critical current density of the sulfide-based ionic-conductive argyrodite structure having the excess sulfur is at least 40% greater than a critical current density of a nominal stoichiometric sulfide-based ionic-conductive argyrodite structure not having the excess sulfur.

90. The solid-state electrolyte material of any one of clauses 69 to 89, wherein a critical current density of the sulfide-based ionic-conductive argyrodite structure is greater than 0.2 $mA/cm^2$.

91. The solid-state electrolyte material of any one of clauses 69 to 90, wherein a critical current density of the sulfide-based ionic-conductive argyrodite structure is greater than 0.4 $mA/cm^2$.

92. The solid-state electrolyte material of any one of clauses 69 to 91, wherein a critical current density of the sulfide-based ionic-conductive argyrodite structure is greater than 0.6 $mA/cm^2$.

93. The solid-state electrolyte material of any one of clauses 69 to 92, wherein a critical current density of the sulfide-based ionic-conductive argyrodite structure is greater than 0.8 $mA/cm^2$.

94. The solid-state electrolyte material of any one of clauses 69 to 93, wherein a critical current density of the sulfide-based ionic-conductive argyrodite structure is greater than 1.0 $mA/cm^2$.

95. The solid-state electrolyte material of any one of clauses 69 to 94, wherein a critical current density of the sulfide-based ionic-conductive argyrodite structure is greater than 2.0 $mA/cm^2$.

96. The solid-state electrolyte material of any one of clauses 69 to 95, wherein a critical current density of the sulfide-based ionic-conductive argyrodite structure is greater than 3.0 $mA/cm^2$.

97. The solid-state electrolyte material of any one of clauses 69 to 96, wherein a critical current density of the sulfide-based ionic-conductive argyrodite structure is greater than 4.0 $mA/cm^2$.

98. The solid-state electrolyte material of any one of clauses 69 to 97, wherein a critical current density of the sulfide-based ionic-conductive argyrodite structure is greater than 5.0 $mA/cm^2$.

99. The solid-state electrolyte material of any one of clauses 69 to 98, wherein the sulfide-based ionic-conductive argyrodite structure comprises phosphorus.

100. The solid-state electrolyte material of clause 99, wherein the argyrodite structure has more than one halogen.

101. A solid-state electrolyte material, comprising: a sulfide-based ionic-conductive argyrodite structure comprising: lithium; sulfur and optionally in combination with oxygen, selenium, tellurium, or a combination thereof; one or more of boron, gallium, antimony, silicon, germanium, tin, phosphorus, and arsenic; one or more halogens; and excess lithium sulfide incorporated into the sulfide-based ionic-conductive argyrodite structure.

102. The solid-state electrolyte material of clause 101, wherein the sulfide-based ionic-conductive argyrodite structure has the general formula: $Li_{12-m-x+2n}M^{m+}Y_{(6-x)+n}X_x$, where $M^{m}+=B^{3+}$, $Ga^{3+}$, $Sb^{3+}$, $Si^{3+}$, $Ge^{4+}$, $Sn^{4+}$, $P^{5+}$, $As^{5+}$, or a combination thereof; where $Y=S^{2-}$, optionally in combination with $O^{2-}$, $S^{2-}$, $Te^{2-}$, or a combination thereof; where $X^-=F^-$, $Cl^-$, $Br^-$, $I^-$, or a combination thereof; where x is in the range of $0\leq x\leq 2$; and where n is $>0.01$.

103. The solid-state electrolyte material of clause 102, where n is in the range of $0.3<n\leq 20$.

104. The solid-state electrolyte material of clause 101, wherein the sulfide-based ionic-conductive argyrodite structure has the general formula: $Li_{18-2m-x+2n}M_2^{m+}Y_{(9-x)+n}X_x$, where $M^{m+}=B^{3+}$, $Ga^{3+}$, $Sb^{3+}$, $Si^{3+}$, $Ge^{4+}$, $Sn^{4+}$, $P^{5+}$, $As^{5+}$, or a combination thereof; where $Y=S^{2-}$, optionally in combination with $O^{2-}$, $S^{2-}$, $Te^{2-}$, or a combination thereof; where $X^-=F^-$, $Cl^-$, $Br^-$, $I^-$, or a combination thereof; where x is in the range of $0\leq x\leq 2$; and where n is $>0.01$ 105. The solid-state electrolyte material of clause 104, where n is in the range of $0.3<n\leq 20$.

106. The solid-state electrolyte material of any one of clauses 101 to 105, wherein the excess lithium sulfide is present in form of a lithium sulfide layer within the sulfide-based ionic-conductive argyrodite structure.

107. The solid-state electrolyte material of any one of clauses 101 to 106, wherein the excess lithium sulfide is present in form of superlattice stacking faults of multiple lithium sulfide layers within the sulfide-based ionic-conductive argyrodite structure 108. The solid-state electrolyte material of any one of clauses 101 to 107, wherein an electronic conductivity of the sulfide-based ionic-conductive argyrodite structure having the excess lithium sulfide is less than an electronic conductivity of a nominal stoichiometric sulfide-based ionic-conductive argyrodite structure not having the excess lithium sulfide.

109. The solid-state electrolyte material of any one of clauses 101 to 108, wherein an electronic conductivity of the sulfide-based ionic-conductive argyrodite structure having the excess lithium sulfide is less than half of an electronic conductivity of a nominal stoichiometric sulfide-based ionic-conductive argyrodite structure not having the excess lithium sulfide.

110. The solid-state electrolyte material of any one of clauses 101 to 109, wherein an electronic conductivity of the sulfide-based ionic-conductive argyrodite structure having the excess lithium sulfide is less than a quarter of an electronic conductivity of a nominal stoichiometric sulfide-based ionic-conductive argyrodite structure not having the excess lithium sulfide.

111. The solid-state electrolyte material of any one of clauses 101 to 110, wherein an electronic conductivity of the sulfide-based ionic-conductive argyrodite structure having the excess lithium sulfide is approximately a tenth of an electronic conductivity of a nominal stoichiometric sulfide-based ionic-conductive argyrodite structure not having the excess lithium sulfide.

112. The solid-state electrolyte material of any one of clauses 101 to 111, wherein an electronic conductivity of the sulfide-based ionic-conductive argyrodite structure is $<10^{-7}$ S/cm.

113. The solid-state electrolyte material of any one of clauses 101 to 112, wherein an electronic conductivity of the sulfide-based ionic-conductive argyrodite structure is $<10^{-8}$ S/cm.

114. The solid-state electrolyte material of any one of clauses 101 to 113, wherein an electronic conductivity of the sulfide-based ionic-conductive argyrodite structure is $<10^{-9}$ S/cm.

115. The solid-state electrolyte material of any one of clauses 101 to 114, wherein an electronic conductivity of the sulfide-based ionic-conductive argyrodite structure is $<10^{-}$ $_{19}$ S/cm.

116. The solid-state electrolyte material of any one of clauses 101 to 115, wherein a critical current density of the sulfide-based ionic-conductive argyrodite structure having the excess lithium sulfide is greater than a critical current density of a nominal stoichiometric sulfide-based ionic-conductive argyrodite structure not having the excess lithium sulfide.

117. The solid-state electrolyte material of any one of clauses 101 to 116, wherein a critical current density of the sulfide-based ionic-conductive argyrodite structure having the excess lithium sulfide is at least 10% greater than a critical current density of a nominal stoichiometric sulfide-based ionic-conductive argyrodite structure not having the excess lithium sulfide.

118. The solid-state electrolyte material of any one of clauses 101 to 117, wherein a critical current density of the sulfide-based ionic-conductive argyrodite structure having the excess lithium sulfide is at least 20% greater than a critical current density of a nominal stoichiometric sulfide-based ionic-conductive argyrodite structure not having the excess lithium sulfide.

119. The solid-state electrolyte material of any one of clauses 101 to 118, wherein a critical current density of the sulfide-based ionic-conductive argyrodite structure having the excess lithium sulfide is at least 30% greater than a critical current density of a nominal stoichiometric sulfide-based ionic-conductive argyrodite structure not having the excess lithium sulfide.

120. The solid-state electrolyte material of any one of clauses 101 to 119, wherein a critical current density of the sulfide-based ionic-conductive argyrodite structure having the excess lithium sulfide is at least 40% greater than a critical current density of a nominal stoichiometric sulfide-based ionic-conductive argyrodite structure not having the excess lithium sulfide.

121. The solid-state electrolyte material of any one of clauses 101 to 120, wherein a critical current density of the sulfide-based ionic-conductive argyrodite structure is greater than 0.2 $mA/cm^2$.

122. The solid-state electrolyte material of any one of clauses 101 to 121, wherein a critical current density of the sulfide-based ionic-conductive argyrodite structure is greater than 0.4 $mA/cm^2$.

123. The solid-state electrolyte material of any one of clauses 101 to 122, wherein a critical current density of the sulfide-based ionic-conductive argyrodite structure is greater than 0.6 $mA/cm^2$.

124. The solid-state electrolyte material of any one of clauses 101 to 123, wherein a critical current density of the sulfide-based ionic-conductive argyrodite structure is greater than 0.8 $mA/cm^2$.

125. The solid-state electrolyte material of any one of clauses 101 to 124, wherein a critical current density of the sulfide-based ionic-conductive argyrodite structure is greater than 1.0 $mA/cm^2$.

126. The solid-state electrolyte material of any one of clauses 101 to 125, wherein a critical current density of the sulfide-based ionic-conductive argyrodite structure is greater than 2.0 $mA/cm^2$.

127. The solid-state electrolyte material of any one of clauses 101 to 126, wherein a critical current density of the sulfide-based ionic-conductive argyrodite structure is greater than 3.0 $mA/cm^2$.

128. The solid-state electrolyte material of any one of clauses 101 to 127, wherein a critical current density of the sulfide-based ionic-conductive argyrodite structure is greater than 4.0 $mA/cm^2$.

129. The solid-state electrolyte material of any one of clauses 101 to 128, wherein a critical current density of the sulfide-based ionic-conductive argyrodite structure is greater than 5.0 $mA/cm^2$

130. The solid-state electrolyte material of any one of clauses 101 to 129, wherein the sulfide-based ionic-conductive argyrodite structure comprises phosphorus.

131. The solid-state electrolyte material of any one of clauses 101 to 130, wherein the sulfide-based ionic-conductive argyrodite structure comprises more than one halogen.

Although various embodiments of the disclosed solid-state electrolyte material have been shown and described, modifications may occur to those skilled in the art upon reading the specification. The present application includes such modifications and is limited only by the scope of the claims.

What is claimed is:

1. A solid-state electrolyte material, comprising:

a sulfide-based ionic-conductive argyrodite structure comprising:

lithium;

sulfur and optionally in combination with oxygen, selenium, tellurium, or a combination thereof;

phosphorus and optionally in combination with boron, gallium, antimony, silicon, germanium, tin, phosphorus, er arsenic, or a combination thereof;

one or more halogens; and excess sulfur incorporated into the sulfide-based ionic-conductive argyrodite structure, wherein the excess sulfur is in the form of superlattice stacking faults within the sulfide-based ionic-conductive argyrodite structure between lithium-sulfur planes and phosphorous-sulfur-lithium-halogen planes of the argyrodite crystal structure.

2. The solid-state electrolyte material of claim 1, wherein the sulfide-based ionic-conductive argyrodite structure has the general formula: $Li_{12-m-x}M^{m+}Y_{(6-x)+n}X_x$, where $M^{m+}=B^{3+}$, $Ga^{3+}$, $Sb^{3+}$, $Si^{4+}$, $Ge^{4+}$, $Sn^{4+}$, $P^{5+}$, $As^{5+}$, or a combination thereof; where $Y=S^{2-}$, and optionally in combination with $O^{2-}$, $S^{2-}$, $Te^{2-}$, or a combination thereof; where $X^-=F^-$, $Cl^-$, $Br^-$, $I^-$, or a combination thereof; where x is in the range of $0 \leq x \leq 2$; and where n is $>0.01$.

3. The solid-state electrolyte material of claim 1, wherein the sulfide-based ionic-conductive argyrodite structure has the general formula: $Li_{18-2m-x}M_2^{m+}Y_{(9-x)+n}X_x$, where $M^{m+}=B^{3+}$, $Ga^{3+}$, $Sb^{3+}$, $Si^{4+}$, $Ge^{4+}$, $Sn^{4+}$, $P^{5+}$, $As^{5+}$, or a combination thereof; where $Y=S^{2-}$, and optionally in combination with $O^{2-}$, $S^{2-}$, $Te^{2-}$, or a combination thereof; where $X^-=F^-$, $Cl^-$, $Br^-$, $I^-$, or a combination thereof; where x is in the range of $0 \le x \le 2$; and where n is >0.01.

4. The solid-state electrolyte material of claim 1, wherein the excess sulfur is additionally in the form of being disposed within vacancies of the argyrodite structure.

5. The solid-state electrolyte material of claim 1, wherein the excess sulfur is additionally in the form of being disposed within interstitials of the argyrodite structure.

6. The solid-state electrolyte material of claim 1, wherein the sulfide-based ionic-conductive argyrodite structure has the general formula: $Li_{24-3m-x}M_3^{m+}Y_{(12-x)+n}X_x$, where $M^{m+}=B^{3+}$, $Ga^{3+}$, $Sb^{3+}$, $Si^{4+}$, $Ge^{4+}$, $Sn^{4+}$, $P^{5+}$, $As^{5+}$, or a combination thereof; where $Y=S^{2-}$, and optionally in combination with $O^{2-}$, $S^{2-}$, $Te^{2-}$, or a combination thereof; where $X^-=F^-$, $Cl^-$, $Br^-$, $I^-$, or a combination thereof; where x is in the range of $0 \le x \le 2$; and where n is >0.01.

7. The solid-state electrolyte material of claim 1, wherein the excess sulfur in the form of superlattice stacking faults shows a single lithium sulfide peak at 27° corresponding to a (111)-lithium sulfide peak.

8. The solid-state electrolyte material of claim 5, wherein the superlattice stacking faults are formed by a mixture of sulfur-lithium lattices and sulfur-lithium vacancy pairs.

9. The solid-state electrolyte material of claim 1 in the form of powder.

10. The solid-state electrolyte material of claim 1 in the form of a membrane.

11. A method for extracting lithium, comprising:

extracting lithium from a lithium containing solution, wherein the membrane of claim 10 is used to extract the lithium from the lithium containing solution.

12. A method of forming a solid-state electrolyte membrane, the method comprising:

forming a membrane comprising the solid-state electrolyte material of claim 1, wherein the membrane is formed using cold spray, supersonic particle deposition, thermal spray, flame spray or plasma spray.

13. A method of forming a solid-state electrolyte membrane, the method comprising:

forming a membrane comprising the solid-state electrolyte material of claim 1 onto a current collector, an anode or a cathode.

14. A method of forming a solid-state electrolyte membrane, the method comprising:

forming a solid-state electrolyte membrane comprising the solid-state electrolyte material of claim 1, wherein the membrane is formed using pulsed laser deposition or sputtering.

15. A solid-state battery, comprising:

a cathode;

an anode; and the solid-state electrolyte material of claim 1 between the cathode and the anode.

16. A method of manufacturing a solid-state electrolyte material, the method comprising:

providing an argyrodite precursor formulation comprising: lithium; sulfur and optionally in combination with oxygen, selenium, tellurium, or a combination thereof; phosphorus and optionally in combination with one or more of boron, gallium, antimony, silicon, germanium, tin, or arsenic, or a combination thereof; one or more halogens; and excess sulfur; and annealing the argyrodite precursor formulation via solid-state reaction in a closed system to form a sulfide-based ionic-conductive argyrodite structure comprising: the lithium; the sulfur and optionally in combination with oxygen, selenium, tellurium, or a combination thereof; the phosphorus and optionally in combination with one or more of boron, gallium, antimony, silicon, germanium, tin, or arsenic, or a combination thereof; and the one or more halogens, wherein the excess sulfur is incorporated into the sulfide-based ionic-conductive argyrodite structure in the form of superlattice stacking faults within the sulfide-based ionic-conductive argyrodite structure between lithium-sulfur planes and phosphorous-sulfur-lithium-halogen planes of the argyrodite crystal structure.

* * * * *